US012804751B2

(12) United States Patent
Huang

(10) Patent No.: US 12,804,751 B2
(45) Date of Patent: Nov. 17, 2026

(54) WIRELESS COMMUNICATION METHOD AND APPARATUSES

(71) Applicant: GUANGDONG OPPO MOBILE TELECOMMUNICATIONS CORP., LTD., Guangdong (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 298 days.

(21) Appl. No.: 18/614,466

(22) Filed: Mar. 22, 2024

(65) Prior Publication Data

US 2024/0237109 A1 Jul. 11, 2024

Related U.S. Application Data

(63) Continuation of application No. PCT/CN2022/112882, filed on Aug. 16, 2022.

(30) Foreign Application Priority Data

Sep. 29, 2021 (SG) .......................... 10202110856U

(51) Int. Cl.
*H04W 76/15* (2018.01)
*H04W 88/10* (2009.01)

(52) U.S. Cl.
CPC ............ *H04W 76/15* (2018.02); *H04W 88/10* (2013.01)

(58) Field of Classification Search
CPC . H04W 72/0453; H04W 72/27; H04W 76/15; H04W 88/10
See application file for complete search history.

(56) References Cited

U.S. PATENT DOCUMENTS 11,711,183 B2 * 7/2023 Cherian ................ H04L 5/0035 370/330
11,723,006 B2 * 8/2023 Naribole ........... H04W 72/0453 370/329
2016/0330631 A1 11/2016 Wu
2021/0289499 A1 9/2021 Naribole et al.
2022/0140987 A1 * 5/2022 Park ........................ H04L 27/26 370/329
2022/0408355 A1 * 12/2022 Shafin .................. H04B 17/336
2024/0243862 A1 * 7/2024 Saad ...................... H04B 7/024

FOREIGN PATENT DOCUMENTS

CN 103354663 10/2013
CN 110139353 8/2019
WO WO-2020068385 A1 * 4/2020 ............ H04B 7/024

OTHER PUBLICATIONS

WIPO, International Search Report and Written Opinion for International Application No. PCT/CN2022/112882, Nov. 15, 2022.
Au, "Compendium of straw polls and potential changes to the Specification Framework Document Part 2," IEEE P802.11, Wireless LANs, 20/1935r42, Sep. 2021.

* cited by examiner

*Primary Examiner* — Liton Miah
(74) *Attorney, Agent, or Firm* — Hodgson Russ LLP

(57) ABSTRACT

A wireless communication method is applied in a first Access Point (AP) initiating a multi-AP coordination. The method includes: transmitting a first frame to a second AP. The first frame is used for inquiring about whether the second AP intends to participate in the multi-AP coordination. At least a part of a second operating channel of the second AP overlaps with a first operating channel of the first AP.

11 Claims, 22 Drawing Sheets

WIRELESS COMMUNICATION METHOD AND APPARATUSES

CROSS-REFERENCE TO RELATED APPLICATION(S)

This application a continuation of International Application No. PCT/CN2022/112882, filed Aug. 16, 2022, which claims priority to Singapore Patent Application No. 10202110856U, filed Sep. 29, 2021, the entire disclosures of which are hereby incorporated by reference.

TECHNICAL FIELD

The present disclosure relates to communication technology, and more particularly, to a wireless communication method and apparatuses.

BACKGROUND

A new IEEE 802.11 amendment is in development, which defines Extremely High Throughput (EHT) PHYsical layer (PHY) and Medium Access Control (MAC) layers capable of supporting a maximum throughput of at least 30 Gbps. To this end, it has been proposed to increase the maximum channel bandwidth to 320 MHz and increase the maximum number of spatial streams to 16. In addition, it has been proposed to enable a multi-Access Point (multi-AP) coordination in a multi-AP system in order to improve the system throughput. Example multi-AP coordination schemes include multi-AP coordinated DownLink (DL)/UpLink (UL) Orthogonal Frequency Division Multiple Access (OFDMA) and multi-AP coordinated DL/UL Multi-User-Multiple Input Multiple Output (MU-MIMO), etc. However, it is still an open issue to efficiently implement multi-AP coordination in a multi-AP system.

SUMMARY

According to a first aspect of the present disclosure, a wireless communication method is provided. The wireless communication method is applied in a first Access Point (AP) initiating a multi-AP coordination, and includes: transmitting a first frame to a second AP. The first frame is used for inquiring about whether the second AP intends to participate in the multi-AP coordination. At least a part of a second operating channel of the second AP overlaps with a first operating channel of the first AP.

According to a second aspect of the present disclosure, an Access Point (AP) device is provided. The AP device includes: a memory having a computer program stored thereon; and a processor configured to invoke and run the computer program whereby the AP device is operative to perform the method of the above first aspect.

According to a third aspect of the present disclosure, a non-transitory computer readable storage medium is provided. The computer readable storage medium has a computer program stored thereon, and the computer program, when executed by a computer, causes the computer to perform the method of the above first aspect.

BRIEF DESCRIPTION OF THE DRAWINGS

The above and other objects, features and advantages will be more apparent from the following description of embodiments with reference to the figures, in which.

DETAILED DESCRIPTION

Figure 1:
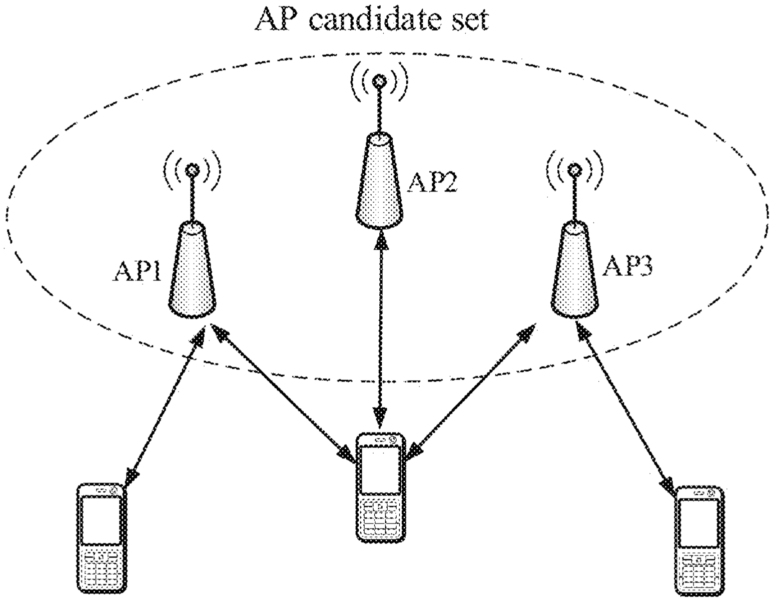
FIG. 1 illustrates an example AP candidate set according to embodiments of the present disclosure.

Hereinafter, the present disclosure will be described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Various embodiments of the present disclosure can be applied to wireless local area network (WLAN) standards, such as the IEEE 802.11 standards including the IEEE 802.11ax specification and the IEEE 802.11be specification, and/or any other appropriate wireless communication standard, such as the Worldwide Interoperability for Microwave Access (WiMAX), Bluetooth, and/or ZigBee standards, and/or any other protocols either currently known or to be developed in the future. The WLAN may include a plurality of Basic Service Sets (BSS), and network nodes in a basic service set are STAtions (STAs). STAs may include Access Point STAs (AP STAs) and non-AP STAs, and each BSS may include one AP STA and a plurality of non-AP STAs associated with the AP. Another version is that STAs include a STA and a peer STA that is in peer to peer communication with the STA. In this case, the peer STA may be an AP STA or a non-AP STA.

The 802.11 communication system may perform communications between an AP STA and a non-AP STA, and may also perform communications between non-AP STAs.

The AP STA (also named as AP for the sake of simplification) is also known as a wireless access point, a hot spot, or the like. The AP is an access point for a mobile user to access a wired network, and is mainly deployed at home, or inside a building or a campus, with a coverage radius typically of tens to hundreds of meters. Certainly, the AP may alternatively be deployed outdoors. An AP is equivalent to a bridge that connects a wired network and a wireless network. A main function of the AP is to connect wireless network clients together and then connect the wireless network to Ethernet. An AP device may be a terminal device (e.g., a mobile phone) or a network device (e.g., a router) with a Wireless Fidelity (Wireless Fidelity, Wi-Fi) chip.

A non-AP STA (also named as STA for the sake of simplification) may be a mobile phone, a tablet computer (pad), a computer with a wireless transceiving function, a virtual reality (VR) device, an augmented reality (AR) device, a wireless device in industrial control, a Set Top Box (STB), a wireless device in self-driving, a vehicle-mounted communication device, a wireless device in remote medical, a wireless device in smart grid, a wireless device in transportation safety, a wireless device in smart city, a wireless device in smart home, and the like.

It shall be noted that a role of a single one STA may be not absolute. For example, when a STA is a mobile phone connected to a router, it may serve as a non-AP STA. But, when the mobile phone provides a hot spot for other mobile phone(s), it actually serves as an AP.

AP and non-AP STA may be devices applied in Internet of Vehicles (IOV), Internet of Things (IoT) nodes, sensors and the like in IoT, smart cameras, smart remote control, smart water meters and electricity meters in smart home, or sensors in smart city, and the like.

Embodiments of the present disclosure may be applied in a wireless communication chip, an Application Specific Integrated Circuit (ASIC), System On Chip (SOC), and the like.

As used herein, a downlink transmission refers to a transmission from an AP device to a STA device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The present disclosure proposes to implement a multi-AP coordination in a multi-AP system.

Hereinafter, AP refers to a standalone AP or an AP affiliated with an AP Multi-Link Device (MLD); while STA refers to a standalone STA or an STA affiliated with a non-AP MLD. An AP candidate set is a set of APs that can initiate or participate in a multi-AP coordination. An AP candidate set may include a coordinator which is responsible for setting up and maintaining the AP candidate set. An AP which obtains a Transmission opportunity (TXOP) and initiates a multi-AP coordination is the sharing AP. An AP in an AP candidate set can participate as a shared AP in a multi-AP coordination initiated by a sharing AP in the same AP candidate set. At least one AP in an AP candidate set shall be capable of being a sharing AP.

A multi-AP coordination may include a multi-AP coordination preparation phase and a multi-AP coordinated transmission phase. In the multi-AP coordination preparation phase, a sharing AP obtaining a TXOP and initiating the multi-AP coordination may transmit a first frame to one or more AP in the same AP candidate set to inquire about respective intentions to participate in the multi-AP coordination. Each of the one or more AP will respond with a second frame to inform the sharing AP of whether it intends to participate in the multi-AP coordination. For example, the first frame may include information indicating an intended multi-AP coordination scheme, and any AP that receives the first frame may get that the sharing AP is inquiring about its intention to participate in the multi-AP coordination, based on the intended multi-AP coordination scheme. If an AP intends to participate in the multi-AP coordination, it becomes a shared AP in the multi-AP coordination. In the multi-AP coordinated transmission phase, the sharing AP and one or more shared AP may participate in a multi-AP coordinated transmission. Alternatively, the sharing AP may not participate in a multi-AP coordinated transmission; and two or more shared APs may participate in a multi-AP coordinated transmission.

FIG. 1 illustrates an example AP candidate set which includes three APs: AP1, AP2 and AP3, according to embodiments of the present disclosure. In an example, AP1 may obtain a TXOP and initiate a multi-AP coordination as the sharing AP; while AP2 and AP3 may participate as the shared APs in the multi-AP coordination. AP1, AP2 and AP3 may participate in a multi-AP coordinated transmission (e.g., multi-AP coordinated DL/UL OFDMA transmission or multi-AP coordinated DL/UL MU-MIMO transmission) in the TXOP. In another example, AP2 may obtain a TXOP and initiate a multi-AP coordination as the sharing AP; and AP1 and AP3 may participate as the shared APs in the multi-AP coordination. AP1 and AP3 may participate in a multi-AP coordinated transmission in the TXOP but AP2 does not participate in the multi-AP coordinated transmission.

It shall be noted that the scenario of FIG. 1 is for sake of illustration, and the present disclosure may be applied to the AP candidate set including two APs or more than three APs.

An AP is able to get Basic Service Set (BSS) operating channel information of other APs in a same AP candidate set from Beacon frames, broadcast Probe Response frames, Channel Switch Announcement frames, Extended Channel Switch Announcement frames, Operating Mode Notification frames and/or other management frames transmitted by the other APs. The BSS operating channel information indicates a BSS operating channel of an AP (also named as an operating channel for the sake of simplification) and may be included in the HT Operation element, VHT Operation element, HE Operation element, EHT Operation element, Neighbor Report element, Reduced Neighbor Report element, Channel Switch Announcement element, Extended Channel Switch Announcement element, Operating Mode Notification element and/or other elements.

In a multi-AP coordination, the sharing AP and each shared AP may not have the same primary 20 MHz channel. The primary 20 MHz channel of each shared AP shall be within a BSS operating channel width of the sharing AP. The primary 20 MHz channel of the sharing AP shall be within a BSS operating channel width of each shared AP.

Figure 2:
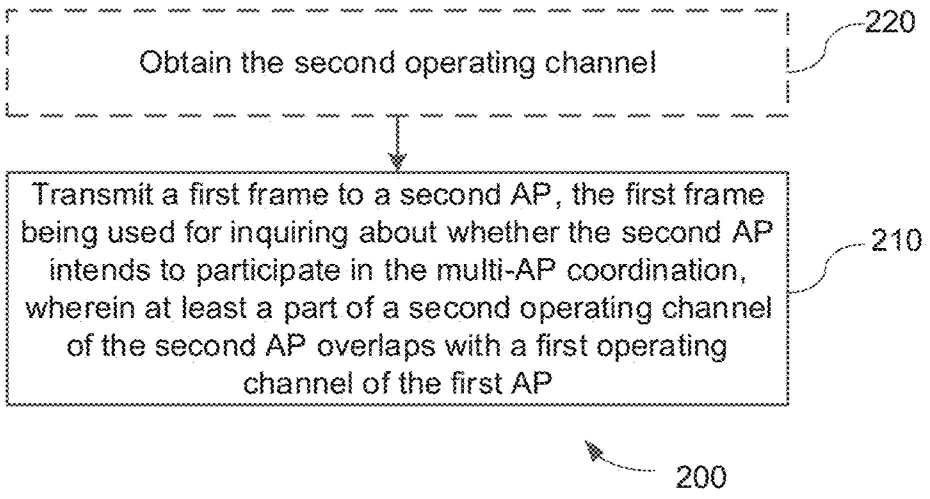
FIG. 2 is a flowchart illustrating a multi-AP coordination preparation phase of a wireless communication method 200 according to embodiments of the present disclosure.

FIG. 2 is a flowchart illustrating a multi-AP coordination preparation phase of a wireless communication method 200 according to embodiments of the present disclosure. The wireless communication method 200 can be performed at a first AP initiating a multi-AP coordination. In this way, the first AP can be called as a sharing AP of the multi-AP coordination. For example, the wireless communication method 200 may be applied in the scenario as illustrated in FIG. 1, and the first AP may be any one of AP1, AP2 or AP3.

At block 210, the first AP transmits a first frame to a second AP. The first frame is used for inquiring about whether the second AP intends to participate in the multi-AP coordination. At least a part of a second operating channel of the second AP overlaps with a first operating channel of the first AP. If the second AP participates in the multi-AP coordination, the second AP may be called as a shared AP of the multi-AP coordination. For example, the second AP may be any one of AP1, AP2 or AP3 other than the sharing AP as illustrated in FIG. 1.

In an embodiment, at least a part of a second operating channel of the second AP overlapping with a first operating channel of the first AP includes any of:

Condition 1: the second operating channel being included in the first operating channel;

Condition 2: the second operating channel being the same as the first operating channel;

Condition 3: the second operating channel being inclusive of the first operating channel of the sharing AP; or Condition 4: the second operating channel partially overlaps with but not included in the first operating channel.

In other words, each shared AP of the multi-AP coordination shall satisfy any of the conditions 1 to 4.

Figure 3A:
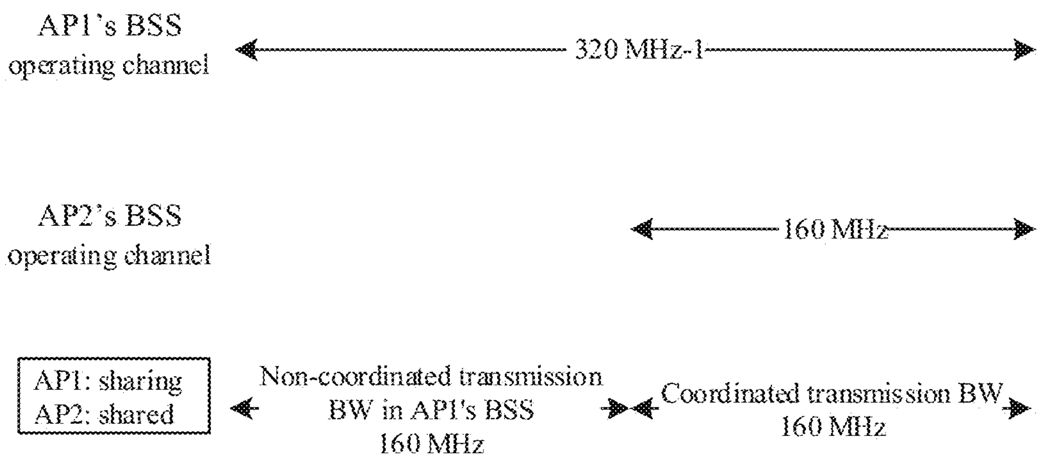
FIG. 3A illustrates a first example of an AP candidate set according to embodiments of the present disclosure.

FIG. 3A illustrates a first example of an AP candidate set, which includes two APs: AP1 and AP2. The BSS operating channel width of AP1 is 320 MHz-1 while the BSS operating channel width of AP2 is 160 MHz. That is, the BSS operating channel of AP2 is included in the BSS operating channel of AP1. In this case, AP2 satisfies the above condition 1, and thus AP2 may participate in the multi-AP coordination initiated by AP1 as a shared AP. In this example, half of the BSS operating channel width of AP1 may be used for a multi-AP coordinated transmission engaged by AP1 and AP2; and the other half of the BSS operating channel width of AP1 may be used for a non-coordinated transmission within AP1's BSS.

A 320 MHz channel consists of any two adjacent 160 MHz channels in the 6 GHz band. Two type of channelizations for the 320 MHz channel are defined as 320 MHz-1 and 320 MHz-2. 320 MHz-1 is defined as 320 MHz channel with channel center frequency numbered 31, 95, and 159, and 320 MHz-2 is defined as 320 MHz channel with channel center frequency numbered 63, 127, and 191.

Figure 3B:
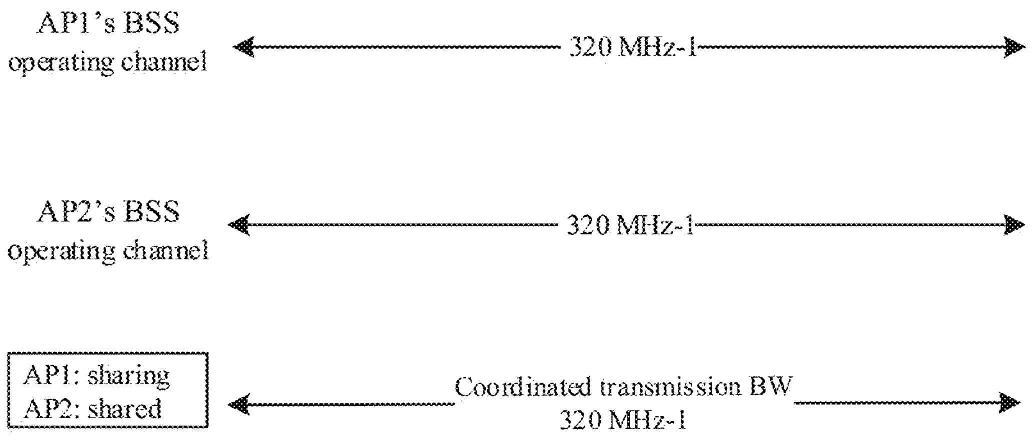
FIG. 3B illustrates a second example of an AP candidate set according to embodiments of the present disclosure.

FIG. 3B illustrates a second example of an AP candidate set, which includes two APs: AP1 and AP2. The BSS operating channel width of AP1 is 320 MHz-1 while the BSS operating channel width of AP2 is 320 MHz-1 as well. That is, the BSS operating channel of AP2 is the same as the BSS operating channel of AP1. In this case, AP2 satisfies the above condition 2, and thus AP2 may participate in a multi-AP coordination initiated by AP1 as a shared AP. In this example, the entire BSS operating channel width of AP1 may be used for a multi-AP coordinated transmission engaged by AP1 and AP2.

Figure 3C:
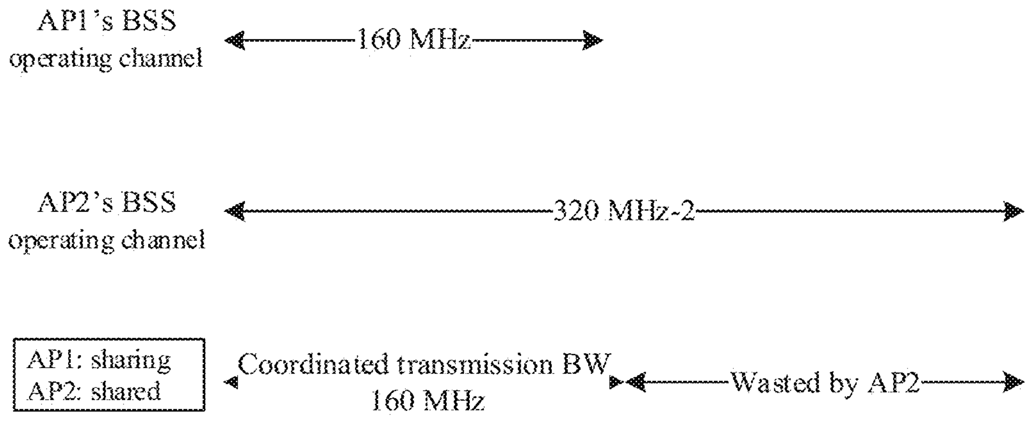
FIG. 3C illustrates a third example of an AP candidate set according to embodiments of the present disclosure.

FIG. 3C illustrates a third example of an AP candidate set, which includes two APs: AP1 and AP2. The BSS operating channel width of AP1 is 160 MHz while the BSS operating channel width of AP2 is 320 MHz-2. That is, the BSS operating channel of AP2 is inclusive of the BSS operating channel of AP1. In this case, AP2 satisfies the above condition 3, and thus AP2 may participate in a multi-AP coordination initiated by AP1 as a shared AP. In this example, the entire BSS operating channel width of AP1 may be used for a multi-AP coordinated transmission engaged by AP1 and AP2. However, half of the BSS operating channel width of AP2 cannot be used by AP2 during the multi-AP coordinated transmission, which may result in resource waste of AP2.

Figure 3D:
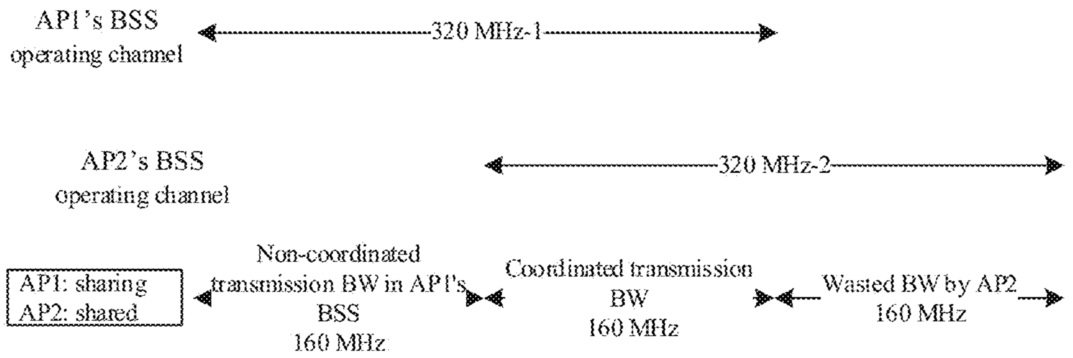
FIG. 3D illustrates a fourth example of an AP candidate set according to embodiments of the present disclosure.

FIG. 3D illustrates a fourth example of an AP candidate set, which includes two APs: AP1 and AP2. The BSS operating channel width of AP1 is 320 MHz-1 while the BSS operating channel width of AP2 is 320 MHz-2. That is, the BSS operating channel of AP2 partially overlaps with but is not included in the BSS operating channel of AP1. In this case, AP2 satisfies the above condition 4, and thus AP2 may participate in a multi-AP coordination initiated by AP1 as a shared AP. In this example, half of the BSS operating channel width of AP1 may be used for a multi-AP coordinated transmission engaged by AP1 and AP2. The other half of the BSS operating channel width of AP1 may be used for a non-coordinated transmission within AP1's BSS. However, half of the BSS operating channel width of AP2 cannot be used by AP2 during the multi-AP coordinated transmission, which may result in resource waste of AP2.

In order to avoid resource waste occurring in the above third and fourth examples, another embodiment is proposed, in which the at least a part of a second operating channel of the second AP overlapping with a first operating channel of the first AP includes only the condition 1 or 2.

In other words, each shared AP of the multi-AP coordination shall satisfy any of condition 1 and condition 2. Then, if the BSS operating channel of an AP is inclusive of the BSS operating channel of the sharing AP or if the BSS operating channel of an AP is partially overlapping but not included in the BSS operating channel of the sharing AP (i.e., the condition 3 or 4 is satisfied), the AP is disallowed to participate in a multi-AP coordination initiated by the sharing AP.

Referring back to FIG. 2, as an embodiment of the present disclosure, the wireless communication method 200 may further include a step of obtaining the second operating channel, as illustrated by block 220. For example, before transmitting the first frame, the first AP may determine in advance whether the second operating channel satisfies any of conditions 1 to 4 or any of conditions 1 to 2 based on the obtained second operating channel, i.e., whether the second AP is allowed to participate in the multi-AP coordination initiated by the first AP. If yes, the transmission of the first frame proceeds. If the first AP determines that the second AP is disallowed to participate in the multi-AP coordination, the transmission of the first frame to the second AP may be omitted.

Figure 4:
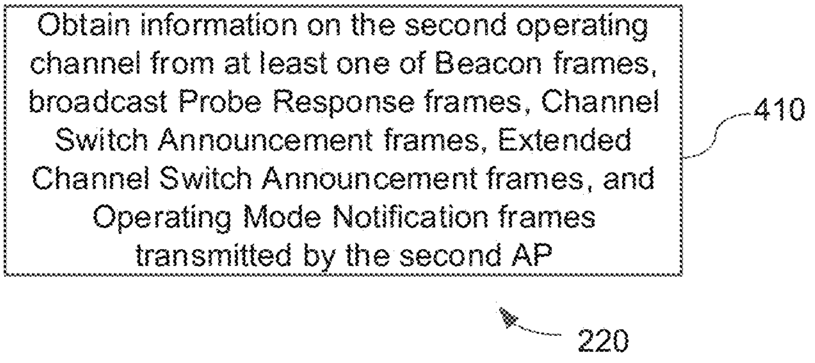
FIG. 4 shows an exemplary implementation of block 220.

FIG. 4 shows an exemplary implementation of block 220. As illustrated, block 220 may be implemented by block 410. At block 410, information on the second operating channel may be obtained from at least one of Beacon frames, broadcast Probe Response frames, Channel Switch Announcement frames, Extended Channel Switch Announcement frames, and Operating Mode Notification frames transmitted by the second AP.

For example, the information on the second operating channel may be included in at least one of a High Throughout (HT) Operation element, a Very High Throughput (VHT) Operation element, a High Efficiency (HE) Operation element, an Extremely High Throughput (EHT) Operation element, a Neighbor Report element, a Reduced Neighbor Report element, a Channel Switch Announcement element, an Extended Channel Switch Announcement element, and an Operating Mode Notification element.

The steps as illustrated by blocks 210 and 220 in FIG. 2 belong to a multi-AP coordination preparation phase of the multi-AP coordination. The multi-AP coordination further includes a multi-AP coordination transmission phase, in which Extremely High Throughput (EHT) Physical layer Protocol Data Units (PPDUs) may be transmitted.

Figure 5A:
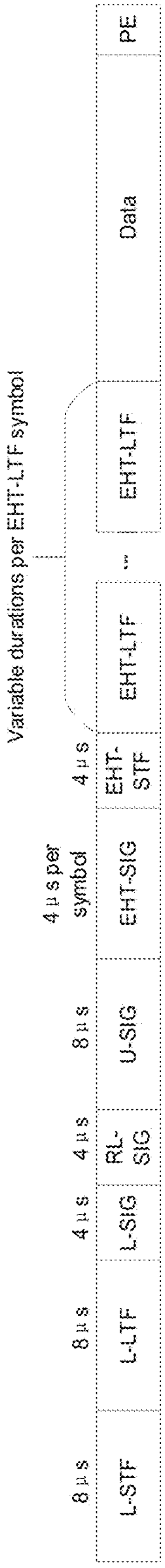
FIG. 5A is a schematic diagram showing an EHT MU PPDU format.

EHT PPDU has two formats: EHT Multi-User (MU) PPDU and EHT Trigger Based (TB) PPDU. The EHT MU PPDU format as shown in FIG. 5A is used for a transmission that is not a response to a Trigger frame from an AP. In an EHT MU PPDU, the Non-High Throughput (HT) Short Training Field (L-STF), Non-HT Long Training Field (L-LTF), Non-HT SIGNAL field (L-SIG), Repeated L-SIG (RL-SIG), Universal SIGNAL field (U-SIG) and EHT SIGNAL field (EHT-SIG) are called pre-EHT modulated fields while the EHT-STF, EHT-LTF, Data field and Packet Extension (PE) are called EHT modulated fields. Each EHT-LTF symbol has the same Guard Interval (GI) as each data symbol, which is 0.8 μs, 1.6 μs or 3.2 μs. The EHT-LTF includes three types: 1× EHT-LTF, 2× EHT-LTF and 4× EHT-LTF. The duration of each 1× EHT-LTF, 2× EHT-LTF or 4× EHT-LTF symbol without GI is 3.2 μs, 6.4 μs or 12.8 μs. Each data symbol without GI is 12.8 μs. The PE duration of an EHT MU PPDU is 0 μs, 4 μs, 8 μs, 12 μs, 16 μs or 20 μs.

Figure 5B:
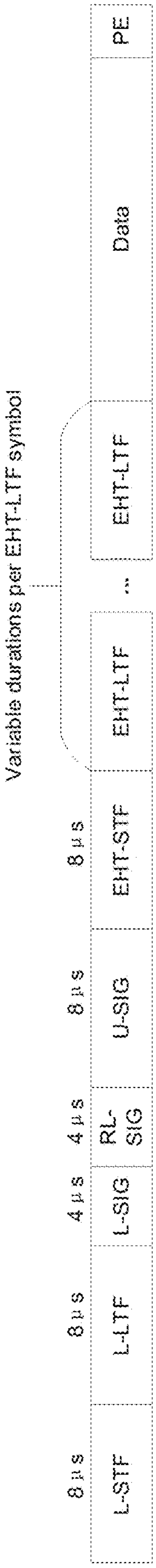
FIG. 5B is a schematic diagram showing an EHT TB PPDU format.

The EHT TB PPDU format as shown in FIG. 5B is used for a transmission that is a response to a Trigger frame from an AP. In an EHT TB PPDU, the L-STF, L-LTF, L-SIG, RL-SIG and U-SIG are called pre-EHT modulated fields while the EHT-STF, EHT-LTF, Data field and PE are called EHT modulated fields. Each EHT-LTF symbol has the same GI as each data symbol, which is 0.8 μs, 1.6 μs or 3.2 μs. The EHT-LTF includes three types: 1× EHT-LTF, 2× EHT-LTF and 4× EHT-LTF. The duration of each 1× EHT-LTF, 2× EHT-LTF or 4× EHT-LTF symbol without GI is 3.2 μs, 6.4 μs or 12.8 μs. Each data symbol without GI is 12.8 μs. The PE duration of an EHT TB PPDU is 0 μs, 4 μs, 8 μs, 12 μs, 16 μs or 20 μs.

After the multi-AP coordination preparation phase, the multi-AP coordination is established and a coordinated transmission bandwidth is determined by the sharing AP and indicated to each shared AP. Hereinafter, the coordinated transmission bandwidth is common for each AP participating in the multi-AP coordination.

Figure 6:
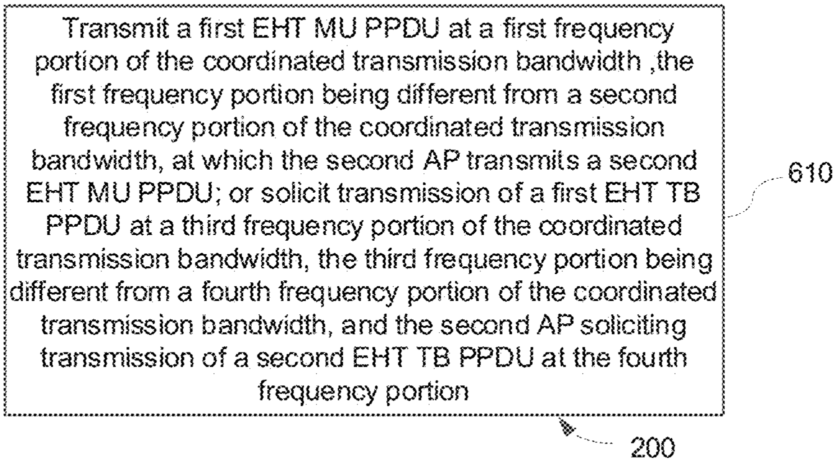
FIG. 6 is a flowchart illustrating a multi-AP coordination transmission phase of the wireless communication method 200 according to embodiments of the present disclosure.
Figure 7:
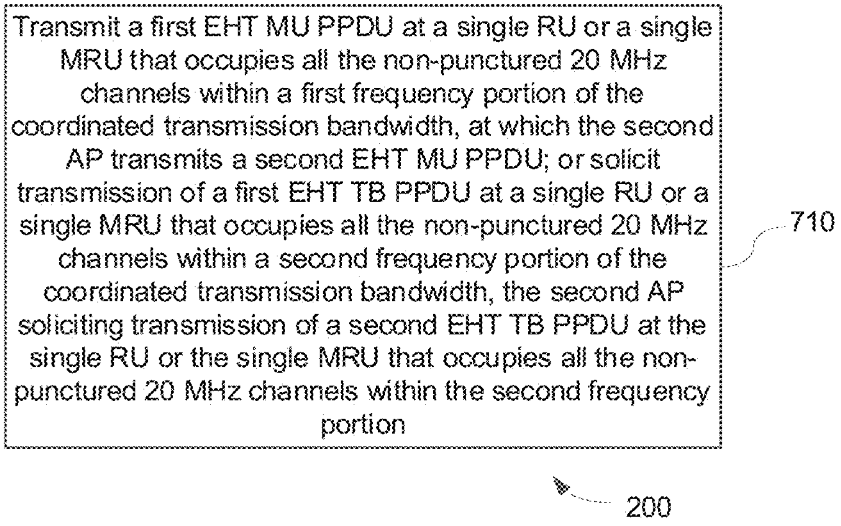
FIG. 7 is a flowchart illustrating a multi-AP coordination transmission phase of the wireless communication method 200 according to embodiments of the present disclosure.
Figure 8:
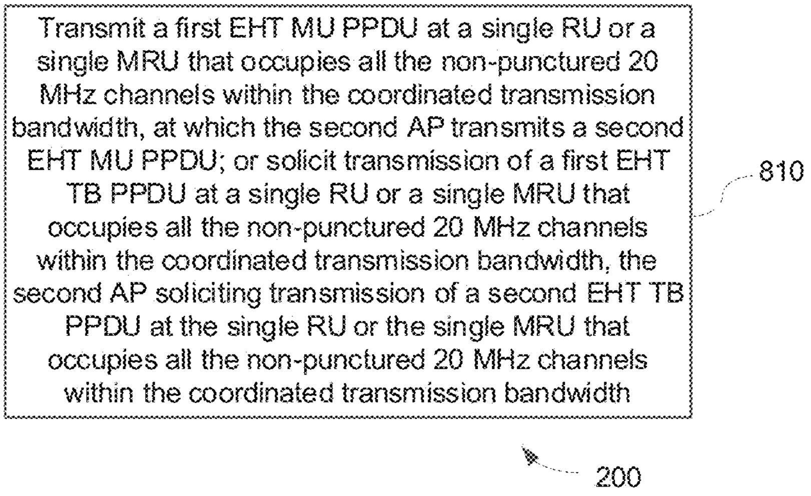
FIG. 8 is a flowchart illustrating a multi-AP coordination transmission phase of the wireless communication method 200 according to embodiments of the present disclosure.

In a case that the first AP participates in the multi-AP coordination, the wireless communication method 200 may further include a multi-AP coordination transmission phase, which will be illustrated in FIGS. 6-8. In the multi-AP coordination transmission phase, both multi-AP coordinated DL transmission and multi-AP coordinated UL transmission can occur in the coordinated transmission bandwidth.

FIG. 6 is a flowchart illustrating a multi-AP coordination transmission phase of the wireless communication method 200 according to embodiments of the present disclosure.

At block 610, the first AP transmits a first EHT MU PPDU at a first frequency portion of the coordinated transmission bandwidth, or solicits transmission of a first EHT TB PPDU at a third frequency portion of the coordinated transmission bandwidth. The first frequency portion is different from a second frequency portion of the coordinated transmission bandwidth, at which the second AP transmits a second EHT MU PPDU. The third frequency portion is different from a fourth frequency portion of the coordinated transmission bandwidth, and the second AP solicits transmission of a second EHT TB PPDU at the fourth frequency portion.

That is to say, in the multi-AP coordination, two or more of the sharing AP and the one or more shared AP may transmit respective EHT MU PPDUs or solicit transmissions of respective EHT TB PPDUs at different frequency portions of the coordinated transmission bandwidth. For example, each frequency portion may include one or more 80 MHz frequency subblocks.

FIG. 7 is a flowchart illustrating a multi-AP coordination transmission phase of the wireless communication method 200 according to embodiments of the present disclosure.

At block 710, the first AP transmits a first EHT MU PPDU at a single Resource Unit (RU) or a single Multiple Resource Unit (MRU) that occupies all the non-punctured 20 MHz channels within a first frequency portion of the coordinated transmission bandwidth, at which the second AP transmits a second EHT MU PPDU; or the first AP solicits transmission of a first EHT TB PPDU at a single RU or a single MRU that occupies all the non-punctured 20 MHz channels within a second frequency portion of the coordinated transmission bandwidth. The second AP solicits transmission of a second EHT TB PPDU at the single RU or the single MRU that occupies all the non-punctured 20 MHz channels within the second frequency portion.

That is to say, in the multi-AP coordination, two or more of the sharing AP and the one or more shared AP may transmit respective EHT MU PPDUs or solicit transmissions of respective EHT TB PPDUs at a same single RU or single MRU that occupies all the non-punctured 20 MHz channels within a same frequency portion of the coordinated transmission bandwidth.

FIG. 8 is a flowchart illustrating a multi-AP coordination transmission phase of the wireless communication method 200 according to embodiments of the present disclosure.

At block 810, the first AP transmits a first EHT MU PPDU at a single RU or a single MRU that occupies all the non-punctured 20 MHz channels within the coordinated transmission bandwidth, at which the second AP transmits a second EHT MU PPDU; or the first AP solicits transmission of a first EHT TB PPDU at a single RU or a single MRU that occupies all the non-punctured 20 MHz channels within the coordinated transmission bandwidth. The second AP solicits transmission of a second EHT TB PPDU at the single RU or the single MRU that occupies all the non-punctured 20 MHz channels within the coordinated transmission bandwidth.

That is to say, in the multi-AP coordination, two or more of the sharing AP and the one or more shared AP may transmit respective EHT MU PPDUs or solicit transmissions of respective EHT TB PPDUs at a same single RU or single MRU that occupies all the non-punctured 20 MHz channels within the coordinated transmission bandwidth.

In an embodiment of the present disclosure, each frequency portion of the coordinated transmission bandwidth includes one or more 80 MHz frequency subblocks.

As a first example, the coordinated transmission bandwidth is 320 MHz and includes two frequency portions each including a different 160 MHz channel.

As a second example, the coordinated transmission bandwidth is 320 MHz and includes three frequency portions, including two frequency portions being two different 80 MHz frequency subblocks in a same 160 MHz channel, respectively, and one frequency portion including the other 160 MHz channel.

As a third example, the coordinated transmission bandwidth is 320 MHz and includes four frequency portions, each of which includes a different 80 MHz frequency subblock.

As a fourth example, the coordinated transmission bandwidth is 320 MHz and includes a punctured 80 MHz frequency subblock and three frequency portions, each of which includes a different 80 MHz frequency subblock.

As a fifth example, the coordinated transmission bandwidth is 320 MHz and includes a punctured 80 MHz frequency subblock and two frequency portions. One of the two frequency portions includes an 80 MHz frequency subblock which is in a same 160 MHz channel as the punctured 80 MHz frequency subblock, and the other one includes the other 160 MHz channel.

In an embodiment of the present disclosure, each of the first EHT MU PPDU and the second EHT MU PPDU has a same number of EHT-SIG symbols, a same GI, a same EHT-LTF type, a same number of EHT-LTF symbols, and a same duration of Data field and PE field; or each of the first EHT TB PPDU and the second EHT TB PPDU has a same GI, a same EHT-LTF type, a same number of EHT-LTF symbols, and a same duration of Data field and PE field.

In an embodiment of the present disclosure, EHT-SIG fields of the first EHT MU PPDU and the second EHT MU PPDU have the same content, and/or U-SIG fields of the first EHT MU PPDU and the second EHT MU PPDU have the same content.

In an embodiment of the present disclosure, U-SIG fields of the first EHT TB PPDU and the second EHT TB PPDU have the same content.

Figure 9:
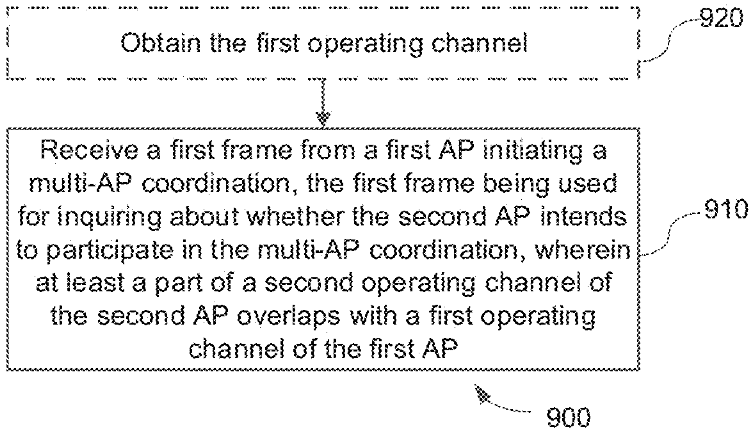
FIG. 9 is a flowchart illustrating a multi-AP coordination preparation phase of a wireless communication method 900 according to embodiments of the present disclosure.

FIG. 9 is a flowchart illustrating a multi-AP coordination preparation phase of a wireless communication method 900 according to embodiments of the present disclosure. The wireless communication method 900 can be performed at a second AP. For example, the wireless communication method 900 may be applied in the scenario as illustrated in FIG. 1.

At block 910, the second AP receives a first frame from a first AP initiating a multi-AP coordination. The first frame is used for inquiring about whether the second AP intends to participate in the multi-AP coordination. At least a part of a second operating channel of the second AP overlaps with a first operating channel of the first AP. If the second AP participates in the multi-AP coordination, the second AP may be called as a shared AP of the multi-AP coordination. For example, the first AP and the second AP may be two different ones of AP1, AP2 and AP3 as illustrated in FIG. 1.

In an embodiment, the second AP shall satisfy any of the conditions 1 to 4, so that it is allowed to participate in the multi-AP coordination.

In another embodiment, the second AP shall satisfy only any of the conditions 1 and 2, so that it is allowed to participate in the multi-AP coordination. In this embodiment, if the second AP satisfies the condition 3 or 4, it is disallowed to participate in the multi-AP coordination.

In an embodiment, the wireless communication method 900 may further include a step of obtaining the first operating channel, as illustrated by block 920. For example, after receiving the first frame, the second AP may determine whether the second operating channel satisfies any of conditions 1 to 4 or any of conditions 1 to 2 based on the obtained first operating channel, i.e., whether the second AP is allowed to participate in the multi-AP coordination initiated by the first AP.

Figure 10:
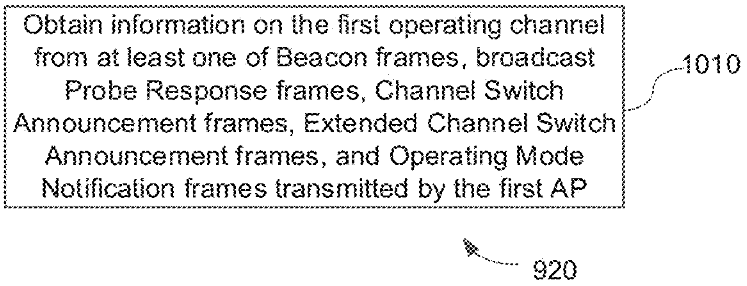
FIG. 10 shows an exemplary implementation of block 920.

FIG. 10 shows an exemplary implementation of block 920. As illustrated, block 920 may be implemented by block 1010. At block 1010, information on the first operating channel may be obtained from at least one of Beacon frames, broadcast Probe Response frames, Channel Switch Announcement frames, Extended Channel Switch Announcement frames, and Operating Mode Notification frames transmitted by the first AP.

For example, the information on the first operating channel may be included in at least one of a HT Operation element, a VHT Operation element, a HE Operation element, an EHT Operation element, a Neighbor Report element, a Reduced Neighbor Report element, a Channel Switch Announcement element, an Extended Channel Switch Announcement element, and an Operating Mode Notification element.

The steps as illustrated by blocks 910 and 920 in FIG. 9 belong to a multi-AP coordination preparation phase of the multi-AP coordination. The multi-AP coordination further includes a multi-AP coordination transmission phase, in which EHT PPDUs may be transmitted.

After the multi-AP coordination preparation phase, the multi-AP coordination is established and the coordinated transmission bandwidth is determined by the sharing AP and indicated to each shared AP. Then, the wireless communication method 900 may further include a multi-AP coordination transmission phase, which will be illustrated in FIGS. 11-13. In the multi-AP coordination transmission phase, both multi-AP coordinated DL transmission and multi-AP coordinated UL transmission can occur in the coordinated transmission bandwidth.

Figure 11:
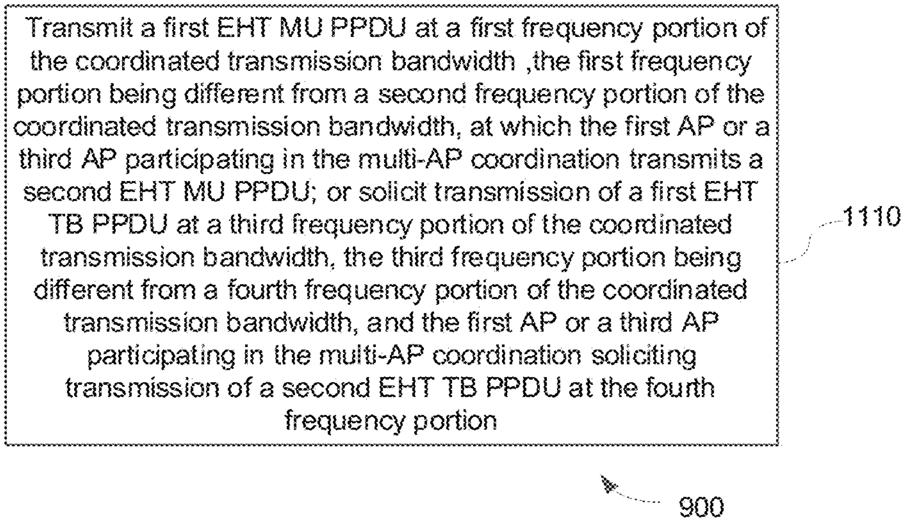
FIG. 11 is a flowchart illustrating a multi-AP coordination transmission phase of the wireless communication method 900 according to embodiments of the present disclosure.

FIG. 11 is a flowchart illustrating a multi-AP coordination transmission phase of the wireless communication method 900 according to embodiments of the present disclosure.

At block 1110, the second AP transmits a first EHT MU PPDU at a first frequency portion of the coordinated transmission bandwidth, or solicits transmission of a first EHT TB PPDU at a third frequency portion of the coordinated transmission bandwidth. The first frequency portion is different from a second frequency portion of the coordinated transmission bandwidth, at which the first AP or a third AP participating in the multi-AP coordination transmits a second EHT MU PPDU. The third frequency portion is different from a fourth frequency portion of the coordinated transmission bandwidth, and the first AP or the third AP solicits transmission of a second EHT TB PPDU at the fourth frequency portion.

That is to say, in the multi-AP coordination, two or more of the sharing AP and the one or more shared AP may transmit respective EHT MU PPDUs or solicit transmissions of respective EHT TB PPDUs at different frequency portions of the coordinated transmission bandwidth. For example, each frequency portion may include one or more 80 MHz frequency subblocks.

Figure 12:
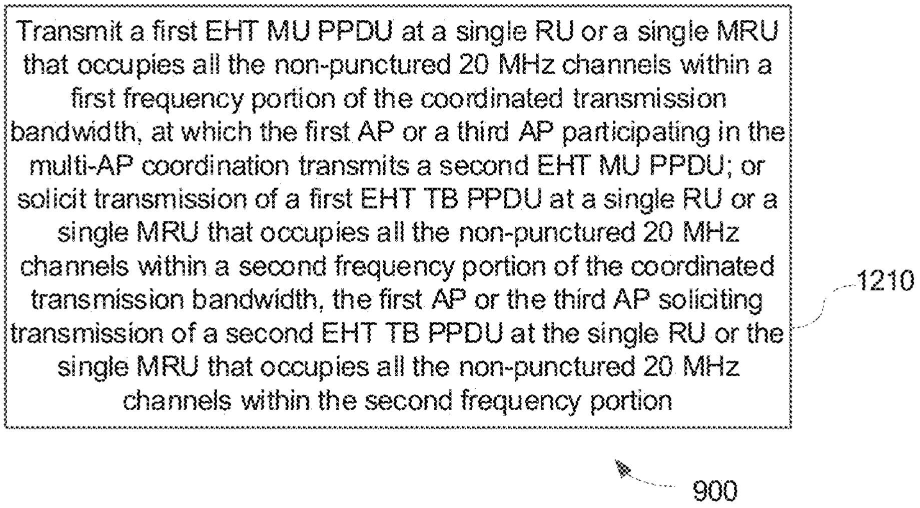
FIG. 12 is a flowchart illustrating a multi-AP coordination transmission phase of the wireless communication method 900 according to embodiments of the present disclosure.

FIG. 12 is a flowchart illustrating a multi-AP coordination transmission phase of the wireless communication method 900 according to embodiments of the present disclosure.

At block 1210, the second AP transmits a first EHT MU PPDU at a single RU or a single MRU that occupies all the non-punctured 20 MHz channels within a first frequency portion of the coordinated transmission bandwidth, at which the first AP or a third AP participating in the multi-AP coordination transmits a second EHT MU PPDU; or the second AP solicits transmission of a first EHT TB PPDU at a single RU or a single MRU that occupies all the non-punctured 20 MHz channels within a second frequency portion of the coordinated transmission bandwidth. The first AP or the third AP solicits transmission of a second EHT TB PPDU at the single RU or the single MRU that occupies all the non-punctured 20 MHz channels within the second frequency portion.

That is to say, in the multi-AP coordination, two or more of the sharing AP and the one or more shared AP may transmit respective EHT MU PPDUs or solicit transmissions of respective EHT TB PPDUs at a same single RU or single MRU that occupies all the non-punctured 20 MHz channels within a same frequency portion of the coordinated transmission bandwidth.

Figure 13:
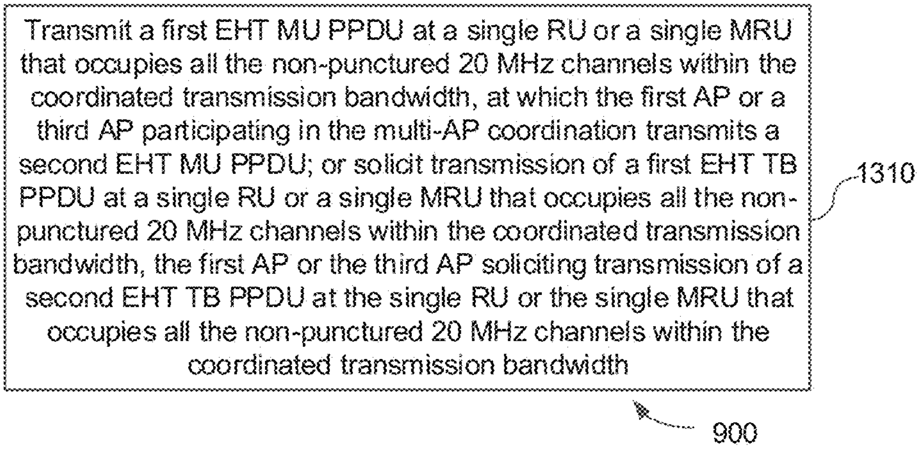
FIG. 13 is a flowchart illustrating a multi-AP coordination transmission phase of the wireless communication method 900 according to embodiments of the present disclosure.

FIG. 13 is a flowchart illustrating a multi-AP coordination transmission phase of the wireless communication method 900 according to embodiments of the present disclosure.

At block 1310, the second AP transmits a first EHT MU PPDU at a single RU or a single MRU that occupies all the non-punctured 20 MHz channels within the coordinated transmission bandwidth, at which the first AP or a third AP participating in the multi-AP coordination transmits a second EHT MU PPDU; or the second AP solicits transmission of a first EHT TB PPDU at a single RU or a single MRU that occupies all the non-punctured 20 MHz channels within the coordinated transmission bandwidth. The first AP or a third AP participating in the multi-AP coordination solicits transmission of a second EHT TB PPDU at the single RU or the single MRU that occupies all the non-punctured 20 MHz channels within the coordinated transmission bandwidth.

That is to say, in the multi-AP coordination, two or more of the sharing AP and the one or more shared AP may transmit respective EHT MU PPDUs or solicit transmissions of respective EHT TB PPDUs at a same single RU or single MRU that occupies all the non-punctured 20 MHz channels within the coordinated transmission bandwidth.

In an embodiment of the present disclosure, each of the first EHT MU PPDU and the second EHT MU PPDU has a same number of EHT-SIG symbols, a same GI, a same EHT-LTF type, a same number of EHT-LTF symbols, and a same duration of Data field and PE field; or each of the first EHT TB PPDU and the second EHT TB PPDU has a same GI, a same EHT-LTF type, a same number of EHT-LTF symbols, and a same duration of Data field and PE field.

In an embodiment of the present disclosure, EHT-SIG fields of the first EHT MU PPDU and the second EHT MU PPDU have the same content, and/or U-SIG fields of the first EHT MU PPDU and the second EHT MU PPDU have the same content.

In an embodiment of the present disclosure, U-SIG fields of the first EHT TB PPDU and the second EHT TB PPDU have the same content.

The multi-AP coordination transmission phase includes a multi-AP coordinated DL transmission and a multi-AP coordinated UL transmission. Hereinafter, the multi-AP coordination transmission phase will be exemplified from these two aspects.

A multi-AP coordinated DL transmission may be a multi-AP coordinated DL Orthogonal Frequency Division Multiple Access (OFDMA) transmission or a multi-AP coordinated DL MU-MIMO transmission. In a multi-AP coordinated DL transmission, two or more of the sharing AP and one or more shared APs may transmit respective EHT MU PPDUs at a single RU or MRU that occupies all the non-punctured 20 MHz channels within a coordinated transmission bandwidth. In a multi-AP coordinated DL OFDMA transmission, two or more of the sharing AP and one or more shared APs transmit respective EHT MU PPDUs at different frequency portions of the coordinated transmission bandwidth where each frequency portion includes one or more 80 MHz frequency subblocks. In another multi-AP coordinated DL OFDMA transmission, more than one of the sharing AP and one or more shared APs may transmit respective EHT MU PPDUs at a single RU or MRU that occupies all the non-punctured 20 MHz channels within a same frequency portion of a coordinated transmission bandwidth in a similar manner to a multi-AP coordinated DL transmission.

A multi-AP coordinated DL MU-MIMO transmission is applicable to a coordinated transmission bandwidth of 20 MHz, 40 MHz, 80 MHz, 160 MHz or 320 MHz. A multi-AP coordinated DL OFDMA transmission is applicable to a coordinated transmission bandwidth of 160 MHz or 320 MHz but not applicable to a coordinated transmission bandwidth of 20 MHz, 40 MHz or 80 MHz.

In a multi-AP coordinated DL transmission, EHT MU PPDUs transmitted by two or more of the sharing AP and one or more shared APs shall have a same number of EHT-SIG symbols, a same GI, a same EHT-LTF type, a same number of EHT-LTF symbols and a same duration of Data field and PE field. As a result, all the EHT MU PPDUs have a same transmission time.

When two or more of the sharing AP and one or more shared APs transmit respective EHT MU PPDUs at a single RU or MRU that occupies all the non-punctured 20 MHz channel within a coordinated transmission bandwidth or a same frequency portion of a coordinated transmission bandwidth, the U-SIG fields of the transmitted EHT MU PPDUs shall have the same content; and the EHT-SIG fields of the transmitted EHT MU PPDUs shall have the same content as well.

In a multi-AP coordinated DL OFDMA transmission, EHT MU PPDUs transmitted by two or more of the sharing AP and one or more shared APs are aggregated in frequency domain and forms a MU A-PPDU. AMU A-PPDU consists of multiple EHT MU PPDU sets, each of which includes one or more EHT MU PPDUs transmitted at a same frequency portion of the coordinated transmission bandwidth. The number of EHT MU PPDUs in an EHT MU PPDU set affiliated with a frequency portion of the coordinated transmission bandwidth equals to the number of APs to which the frequency portion is allocated. For example, if a frequency portion of the coordinated transmission bandwidth is allocated to a single AP (e.g., the sharing AP or a shared AP), the EHT MU PPDU set affiliated with the frequency portion includes a single EHT MU PPDU. If a frequency portion of the coordinated transmission bandwidth is allocated to three APs (e.g., the sharing AP and two shared APs, or three shared APs), the EHT MU PPDU set affiliated with the frequency portion includes three EHT MU PPDUs.

Figure 14:
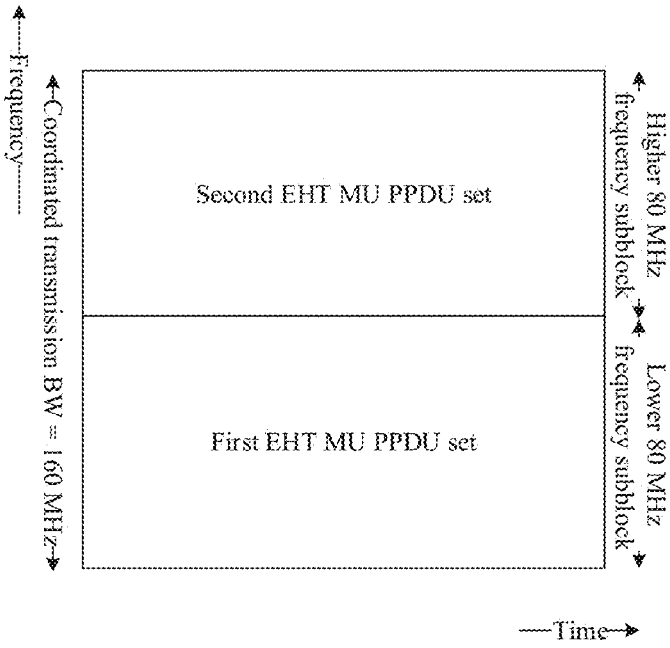
FIG. 14 illustrates a multi-AP coordinated DL OFDMA transmission with a coordinated transmission bandwidth of 160 MHz.

FIG. 14 illustrates a multi-AP coordinated DL OFDMA transmission with a coordinated transmission bandwidth of 160 MHz. As illustrated in FIG. 14, two 80 MHz frequency subblocks are allocated to two EHT MU PPDU sets, respectively.

Figure 15A:
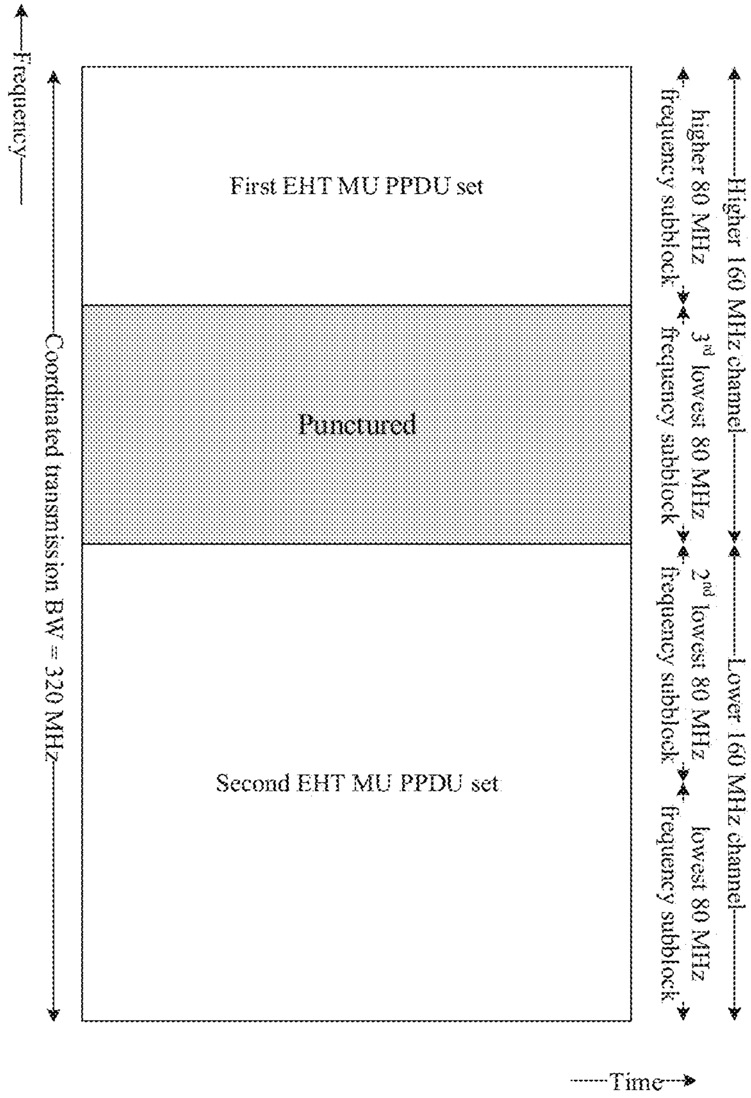
FIG. 15A is a schematic diagram showing a first BW allocation of 320 MHz BW for multiple EHT MU PPDU sets (Option 1A)
Figure 15B:
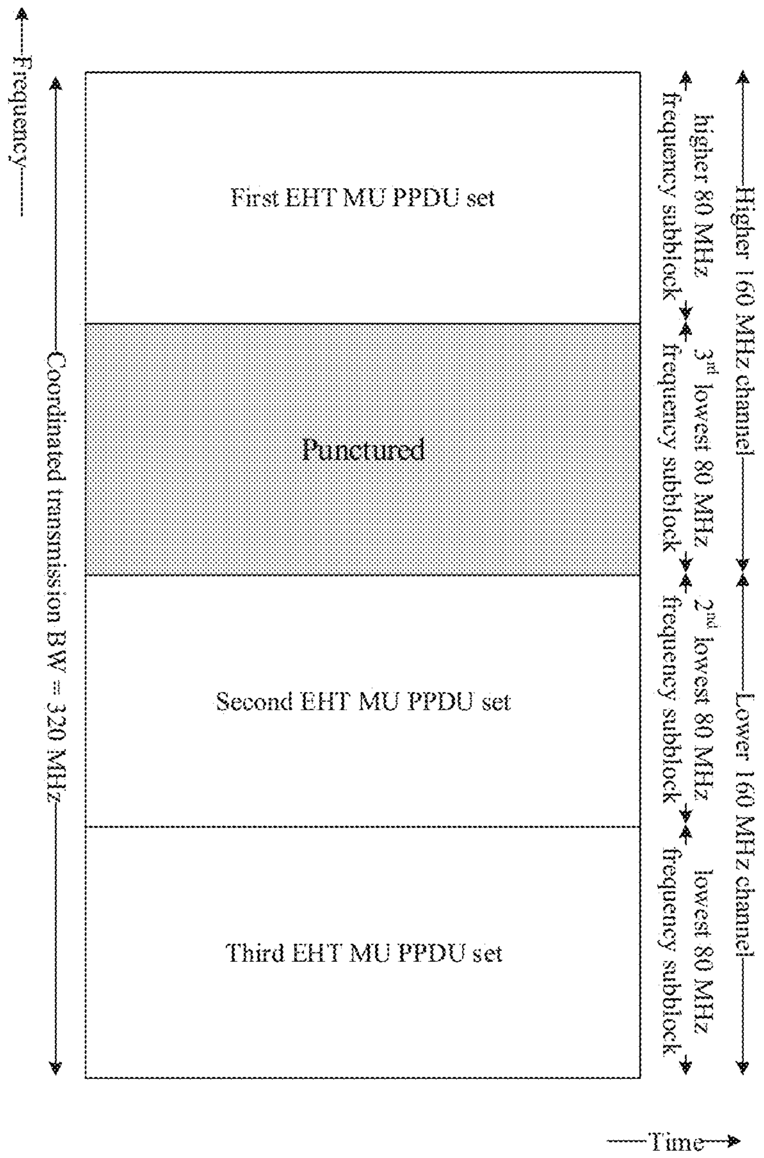
FIG. 15B is a schematic diagram showing a second BW allocation of 320 MHz for multiple EHT MU PPDU sets (Option 1B)
Figure 15C:
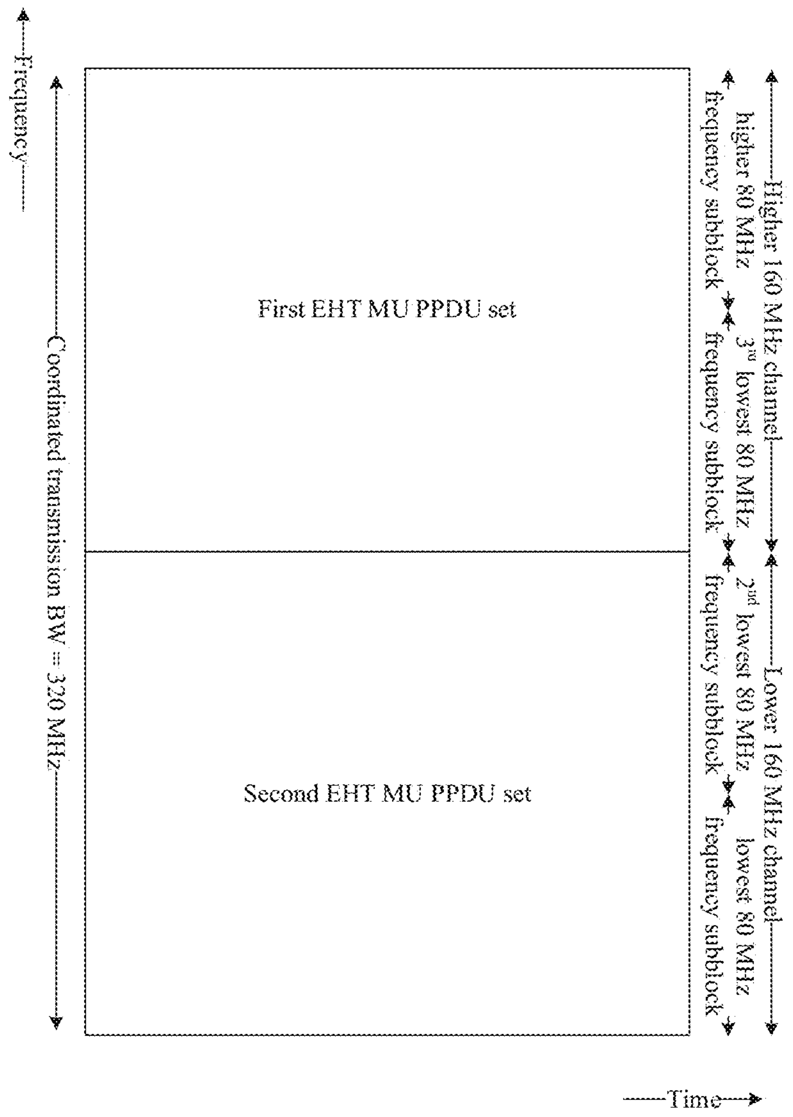
FIG. 15C is a schematic diagram showing a third BW allocation of 320 MHz for multiple EHT MU PPDU sets (Option 1C)
Figure 15D:
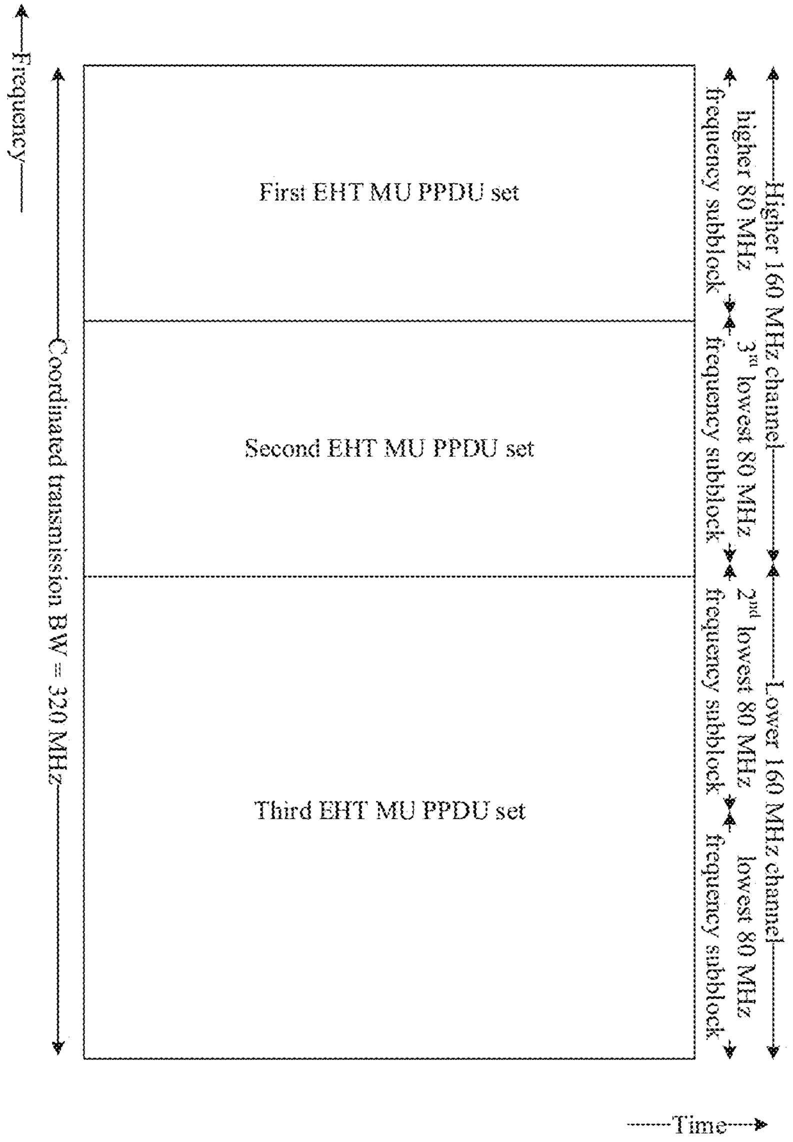
FIG. 15D is a schematic diagram showing a fourth BW allocation of 320 MHz for multiple EHT MU PPDU sets (Option 1D)
Figure 15E:
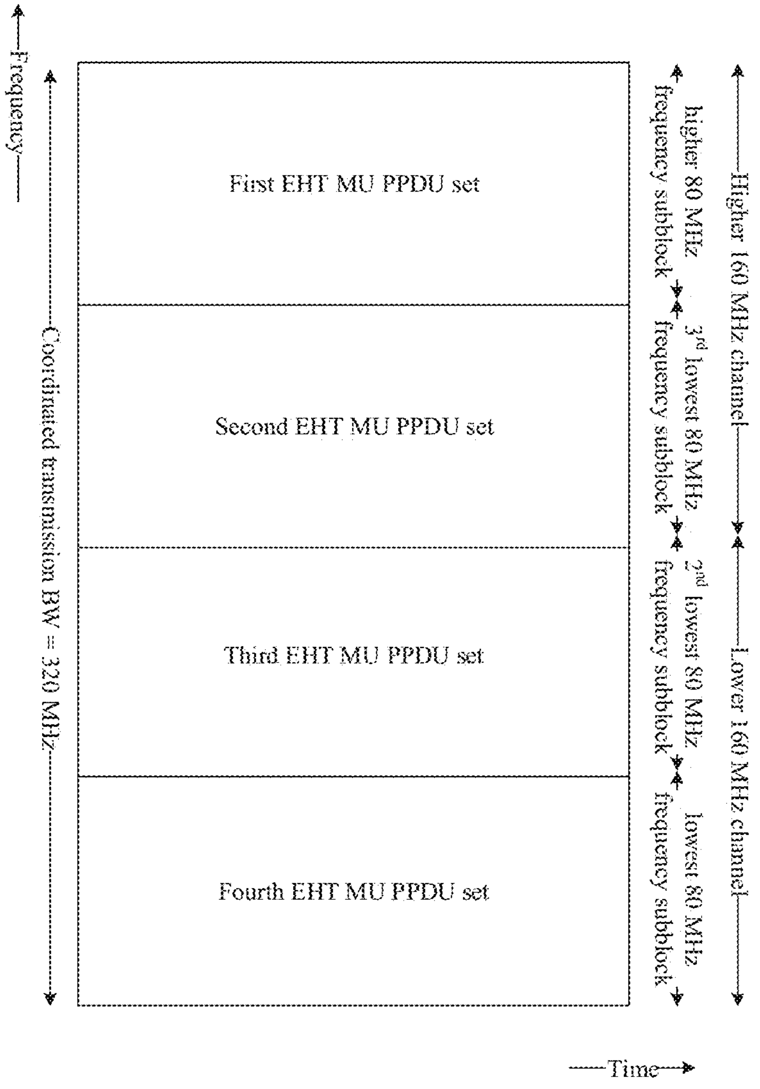
FIG. 15E is a schematic diagram showing a fifth BW allocation of 320 MHz for multiple EHT MU PPDU sets (Option 1E)

For a multi-AP coordinated DL OFDMA transmission with a coordinated transmission bandwidth of 320 MHz, there may have the following five options for bandwidth allocation for multiple EHT MU PPDU sets:

- Option 1A: When one of 80 MHz frequency subblocks is punctured, the non-punctured 80 MHz frequency subblock which is within a same 160 MHz channel as the punctured 80 MHz frequency subblock is allocated to a first EHT MU PPDU set, and the other 160 MHz channel is allocated to a second EHT MU PPDU set, as illustrated in FIG. 15A.
- Option 1B: When one of 80 MHz frequency subblocks is punctured, three non-punctured 80 MHz frequency subblocks are allocated to three EHT MU PPDU sets, respectively, as illustrated in FIG. 15B.
- Option 1C: Two 160 MHz channels are allocated to two EHT MU PPDU sets, respectively, as illustrated in FIG. 15C.
- Option 1D: Two 80 MHz frequency subblocks within a same 160 MHz channel are allocated to first two EHT MU PPDU sets, respectively; and the other 160 MHz channel is allocated to a third EHT MU PPDU set, as illustrated in FIG. 15D.
- Option 1E: Four 80 MHz frequency subblocks are allocated to four EHT MU PPDU sets, respectively, as illustrated in FIG. 15E.

It shall be noted that the present disclosure is not limited to the above five options as illustrated in FIGS. 15A-15E, and other appropriate bandwidth allocations may be also applicable. As an example, the first non-punctured 80 MHz frequency subblock and the punctured 80 MHz frequency subblock in FIG. 15A may be included in the lower 160 MHz channel, rather than the higher 160 MHz channel. As another example, the 80 MHz frequency subblock in FIG. 15B may be included in the lower 160 MHz channel, rather than the higher 160 MHz channel.

A multi-AP coordinated UL transmission may be a multi-AP coordinated UL OFDMA transmission or a multi-AP coordinated UL MU-MIMO transmission. In a multi-AP coordinated UL MU-MIMO transmission, two or more of the sharing AP and one or more shared APs solicit transmissions of respective EHT TB PPDUs at a single RU or MRU that occupies all the non-punctured 20 MHz channels within a coordinated transmission bandwidth. In a multi-AP coordinated UL OFDMA transmission, two or more of the sharing AP and one or more shared APs solicit transmissions of respective EHT TB PPDUs at different frequency portions of a coordinated transmission bandwidth where each frequency portion includes one or more 80 MHz frequency subblock. In another multi-AP coordinated UL OFDMA transmission, more than one of the sharing AP and one or more shared APs may solicit transmissions of respective EHT TB PPDUs at a single RU or MRU that occupies all the non-punctured 20 MHz channels within a same frequency portion of a coordinated transmission bandwidth in a similar manner to a multi-AP coordinated UL MU-MIMO transmission.

A multi-AP coordinated UL MU-MIMO transmission is applicable to a coordinated transmission bandwidth of 20 MHz, 40 MHz, 80 MHz, 160 MHz or 320 MHz. A multi-AP coordinated UL OFDMA transmission is applicable to a coordinated transmission bandwidth of 160 MHz or 320 MHz but not applicable to a coordinated transmission bandwidth of 20 MHz, 40 MHz or 80 MHz.

In a multi-AP coordinated UL transmission, EHT TB PPDUs solicited by two or more of the sharing AP and one or more shared APs shall have a same GI, a same EHT-LTF type, a same number of EHT-LTF symbols and a same duration of Data field and PE field. As a result, all the EHT TB PPDUs have a same transmission time.

When two or more of the sharing AP and one or more shared APs solicit transmissions of respective EHT TB PPDUs at a single RU or MRU that occupies all the non-punctured 20 MHz channels within a coordinated transmission bandwidth or a same frequency portion of a coordinated transmission bandwidth, the U-SIG fields of the solicited EHT TB PPDUs shall have the same content.

In a multi-AP coordinated UL OFDMA transmission, EHT TB PPDUs solicited by two or more of the sharing AP and one or more shared APs are aggregated in frequency domain and forms a TB A-PPDU. ATB A-PPDU consists of multiple EHT TB PPDU sets, each of which includes one or more EHT TB PPDUs transmitted at a same frequency portion of the coordinated transmission bandwidth.

Figure 16:
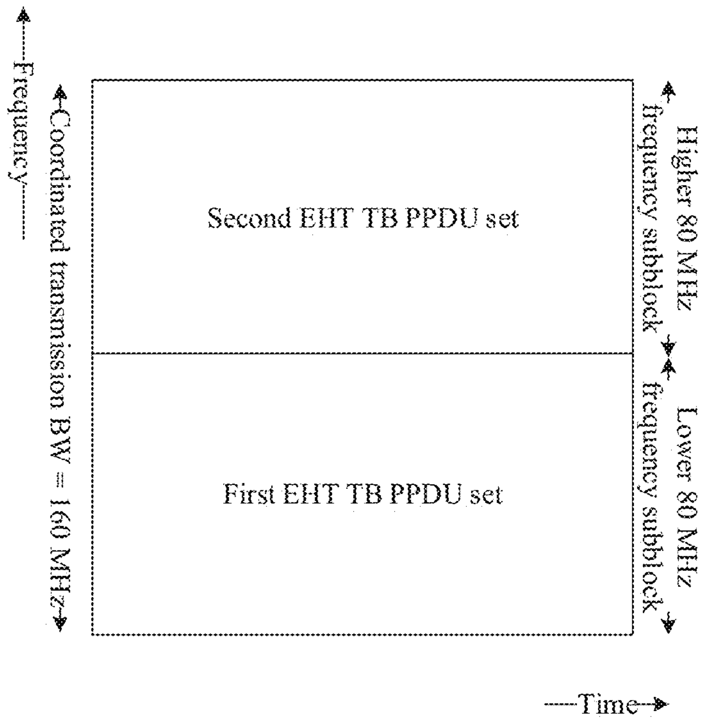
FIG. 16 illustrates a multi-AP coordinated UL OFDMA transmission with a coordinated transmission bandwidth of 160 MHz.

FIG. 16 illustrates a multi-AP coordinated UL OFDMA transmission with a coordinated transmission bandwidth of 160 MHz. As illustrated in FIG. 16, two 80 MHz frequency subblocks are allocated to two EHT TB PPDU sets, respectively.

Figure 17A:
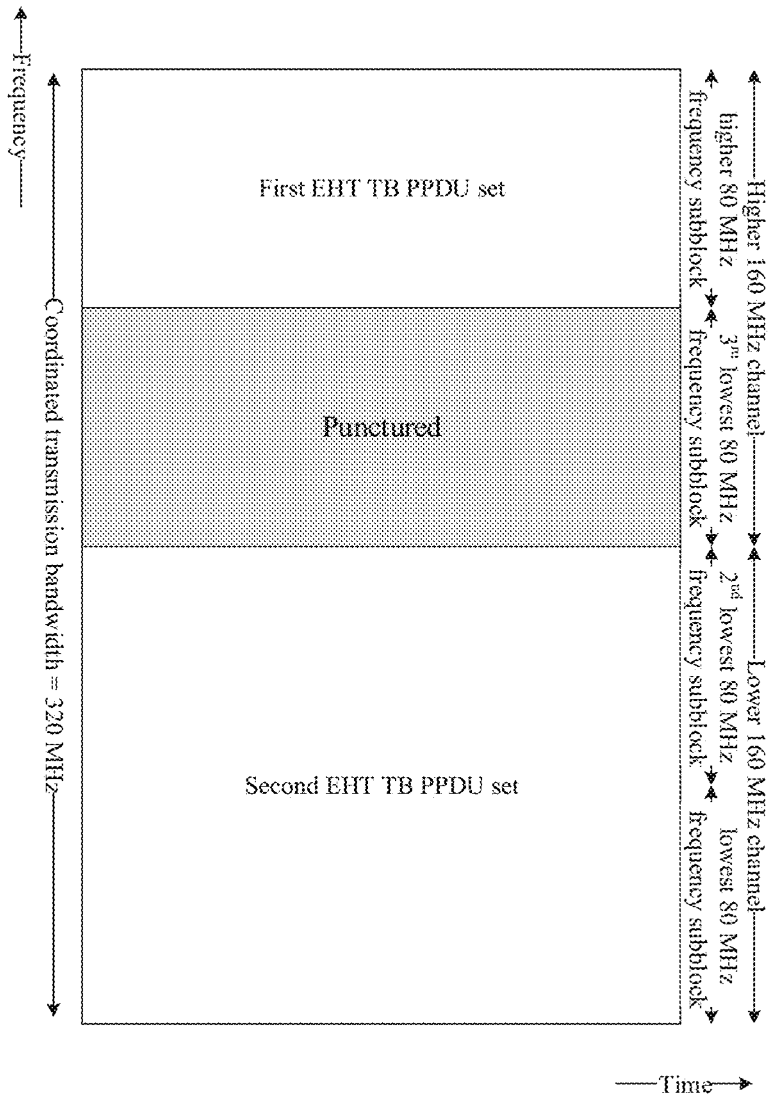
FIG. 17A is a schematic diagram showing a first BW allocation of 320 MHz BW for multiple EHT TB PPDU sets (Option 1A)
Figure 17B:
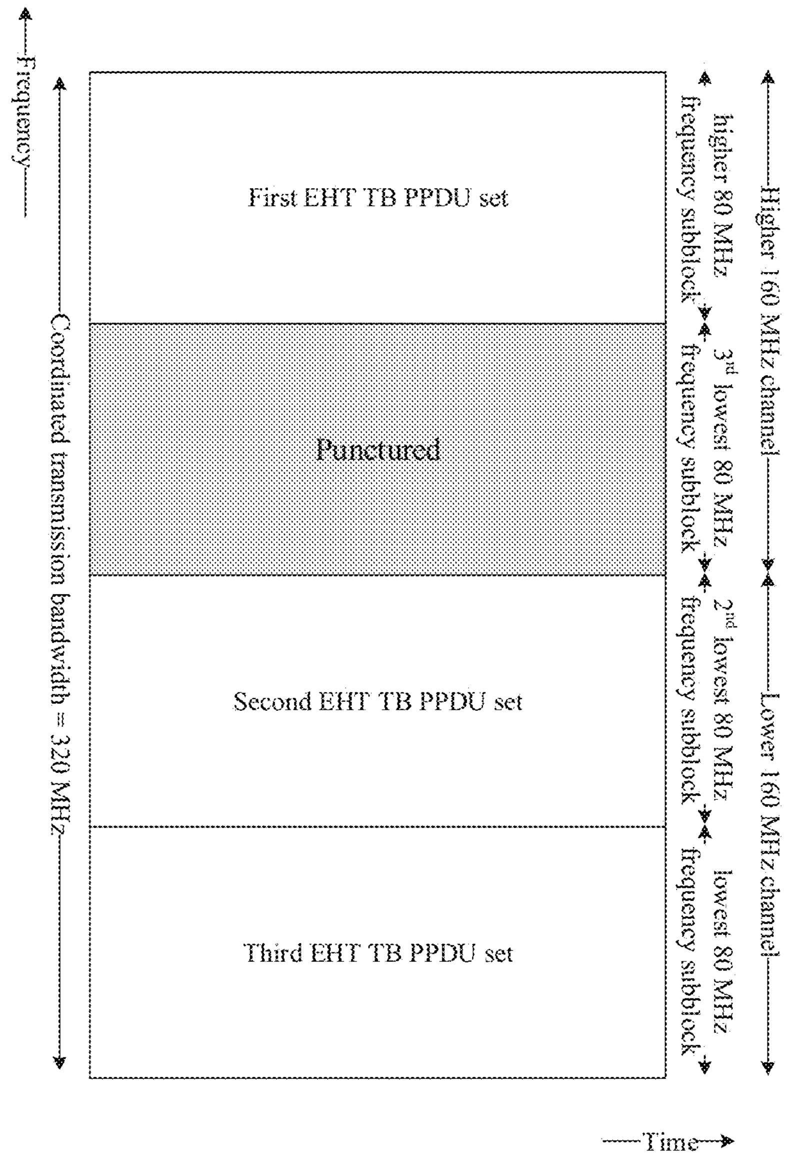
FIG. 17B is a schematic diagram showing a second BW allocation of 320 MHz for multiple EHT TB PPDU sets (Option 1B)
Figure 17C:
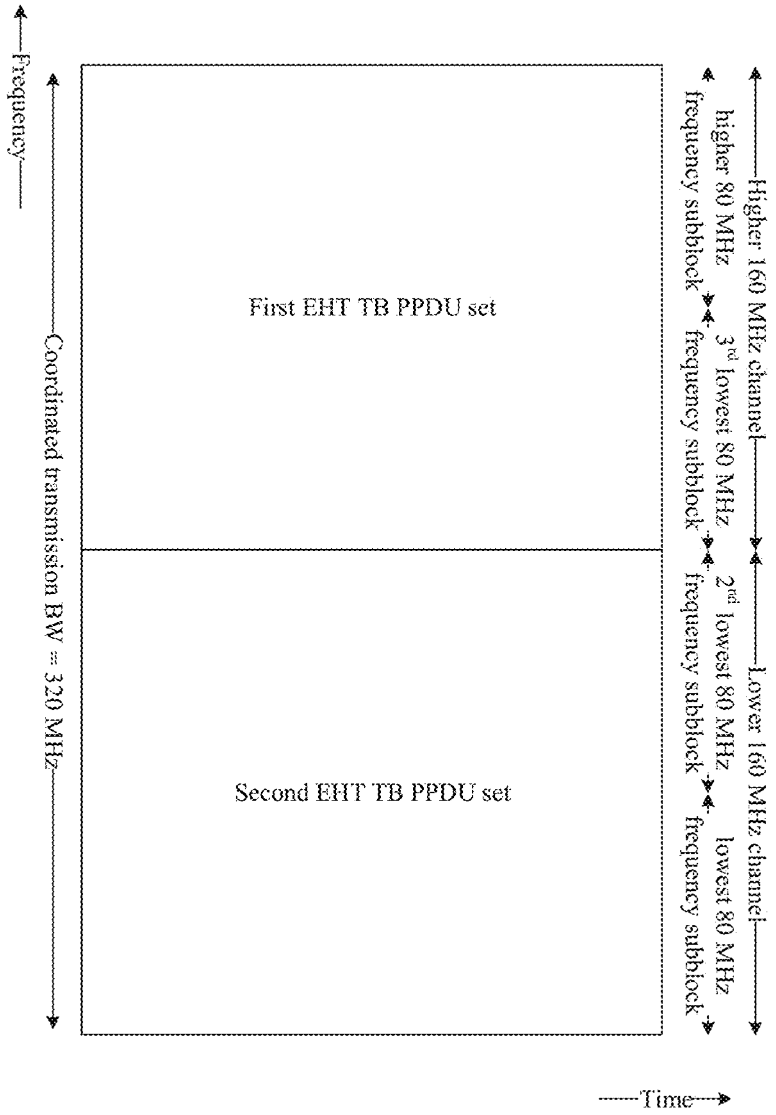
FIG. 17C is a schematic diagram showing a third BW allocation of 320 MHz for multiple EHT TB PPDU sets (Option 1C)
Figure 17D:
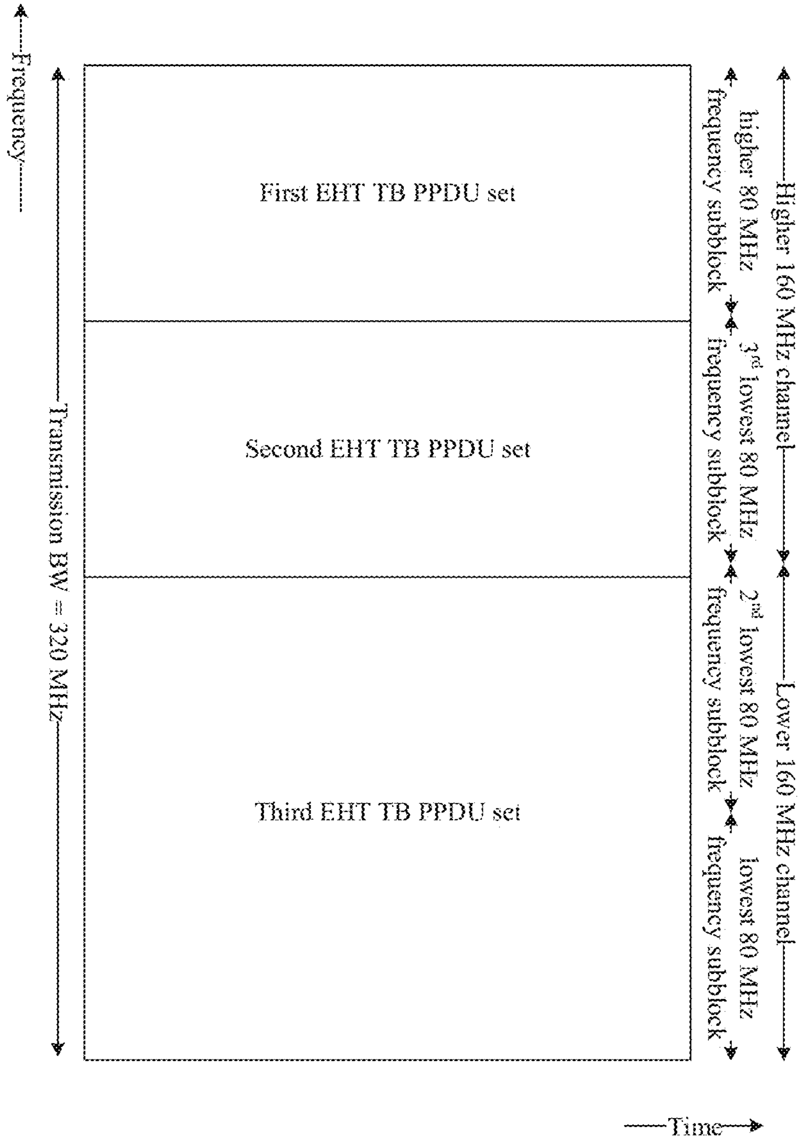
FIG. 17D is a schematic diagram showing a fourth BW allocation of 320 MHz for multiple EHT TB PPDU sets (Option 1D)
Figure 17E:
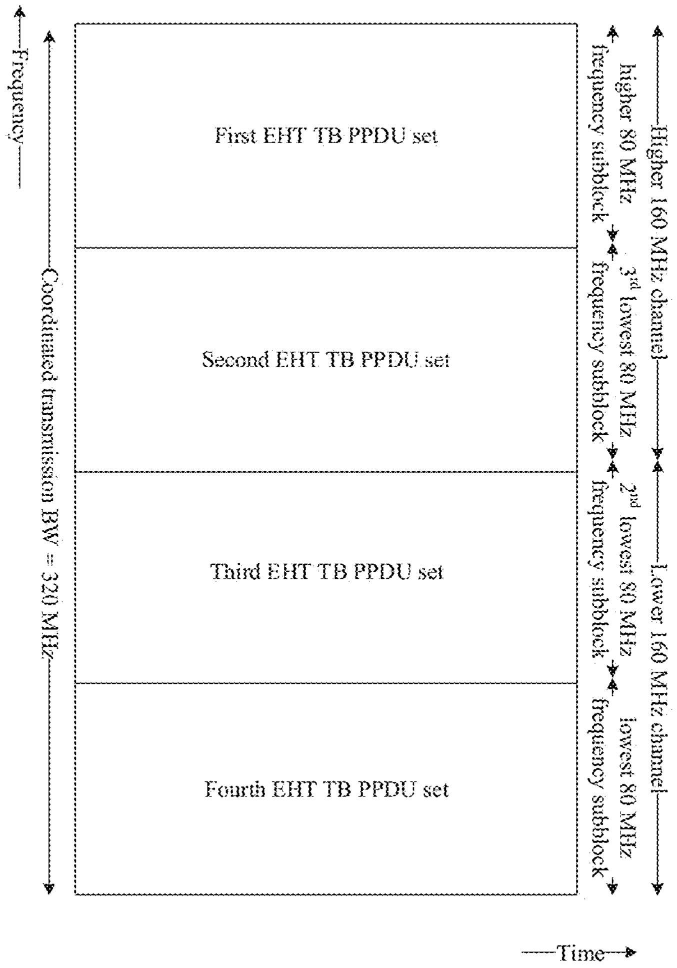
FIG. 17E is a schematic diagram showing a fifth BW allocation of 320 MHz for multiple EHT TB PPDU sets (Option 1E)

For a multi-AP coordinated UL OFDMA transmission with a coordinated transmission bandwidth of 320 MHz, there may have the following five options for bandwidth allocation for multiple EHT TB PPDU sets:

- Option 1A: When one of 80 MHz frequency subblocks is punctured, the non-punctured 80 MHz frequency subblock which is within a same 160 MHz channel as the punctured 80 MHz frequency subblock is allocated to a first EHT TB PPDU set, and the other 160 MHz channel is allocated to a second EHT TB PPDU set, as illustrated in FIG. 17A.
- Option 1B: When one of 80 MHz frequency subblocks is punctured, three non-punctured 80 MHz frequency subblocks are allocated to three EHT TB PPDU sets, respectively, as illustrated in FIG. 17B.
- Option 1C: Two 160 MHz channels are allocated to two EHT TB PPDU sets, respectively, as illustrated in FIG. 17C.
- Option 1D: Two 80 MHz frequency subblocks within a same 160 MHz channel are allocated to first two EHT TB PPDU sets, respectively; and the other 160 MHz channel is allocated to a third EHT TB PPDU set, as illustrated in FIG. 17D.
- Option 1E: Four 80 MHz frequency subblocks are allocated to four EHT TB PPDU sets, respectively, as illustrated in FIG. 17E.

It shall be noted that the present disclosure is not limited to the above five options as illustrated in FIGS. 17A-17E, and other appropriate bandwidth allocations may be also applicable. As an example, the first non-punctured 80 MHz frequency subblock and the punctured 80 MHz frequency subblock in FIG. 17A may be included in the lower 160 MHz channel, rather than the higher 160 MHz channel. As another example, the 80 MHz frequency subblock in FIG. 17B may be included in the lower 160 MHz channel, rather than the higher 160 MHz channel.

Figure 18:
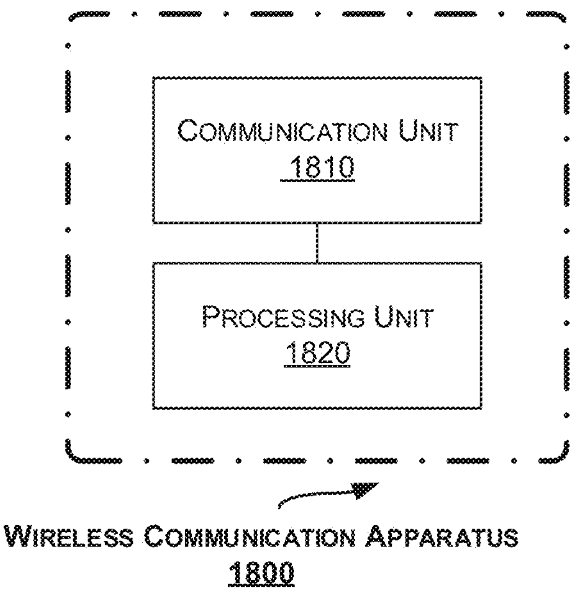
FIG. 18 is a block diagram of a wireless communication apparatus 1800 according to an embodiment of the present disclosure.

Correspondingly to the wireless communication method 200 as described above, a wireless communication apparatus is provided. FIG. 18 is a block diagram of a wireless communication apparatus 1800 according to an embodiment of the present disclosure. The wireless communication apparatus 1800 can be e.g., an AP applicable in IEEE 802.11be EHT WLAN or a next-generation WLAN after EHT WLAN such as Post-EHT WLAN.

As shown in FIG. 18, the wireless communication apparatus 1800 includes: a communication unit 1810 configured to transmit a first frame to a second AP. The first frame is used for inquiring about whether the second AP intends to participate in the multi-AP coordination. A least a part of a second operating channel of the second AP overlaps with a first operating channel of the first AP. In this way, the first AP can be called as a sharing AP of the multi-AP coordination, and if the second AP participates in the multi-AP coordination, the second AP may be called as a shared AP of the multi-AP coordination.

In an embodiment, the communication unit 1810 is further configured to: transmit a first EHT MU PPDU at a first frequency portion of the coordinated transmission bandwidth; or solicit transmission of a first EHT TB PPDU at a third frequency portion of the coordinated transmission bandwidth. The first frequency portion is different from a second frequency portion of the coordinated transmission bandwidth, at which the second AP transmits a second EHT MU PPDU. The third frequency portion is different from a fourth frequency portion of the coordinated transmission bandwidth, and the second AP solicits transmission of a second EHT TB PPDU at the fourth frequency portion.

In an embodiment, the communication unit 1810 is further configured to: transmit a first EHT MU PPDU at a single RU or a single MRU that occupies all the non-punctured 20 MHz channels within a first frequency portion of the coordinated transmission bandwidth, at which the second AP transmits a second EHT MU PPDU; or solicit transmission of a first EHT TB PPDU at a single RU or a single MRU that occupies all the non-punctured 20 MHz channels within a second frequency portion of the coordinated transmission bandwidth. The second AP solicits transmission of a second EHT TB PPDU at the single RU or the single MRU that occupies all the non-punctured 20 MHz channels within the second frequency portion.

In an embodiment, the communication unit 1810 is further configured to: transmit a first EHT MU PPDU at a single RU or a single MRU that occupies all the non-punctured 20 MHz channels within the coordinated transmission bandwidth, at which the second AP transmits a second EHT MU PPDU; or solicit transmission of a first EHT TB PPDU at a single RU or a single MRU that occupies all the non-punctured 20 MHz channels within the coordinated transmission bandwidth. The second AP solicits transmission of a second EHT TB PPDU at the single RU or the single MRU that occupies all the non-punctured 20 MHz channels within the coordinated transmission bandwidth.

In an embodiment of the present disclosure, each of the first EHT MU PPDU and the second EHT MU PPDU has a same number of EHT-SIG symbols, a same GI, a same EHT-LTF type, a same number of EHT-LTF symbols, and a same duration of Data field and PE field; or each of the first EHT TB PPDU and the second EHT TB PPDU has a same GI, a same EHT-LTF type, a same number of EHT-LTF symbols, and a same duration of Data field and PE field.

In an embodiment of the present disclosure, EHT-SIG fields of the first EHT MU PPDU and the second EHT MU PPDU have the same content, and/or U-SIG fields of the first EHT MU PPDU and the second EHT MU PPDU have the same content.

In an embodiment of the present disclosure, U-SIG fields of the first EHT TB PPDU and the second EHT TB PPDU have the same content.

In an embodiment, at least a part of the second operating channel overlapping with the first operating channel includes any of the conditions 1 to 4, or only any of the conditions 1 and 2.

In an embodiment, the wireless communication apparatus 1800 may further include: a processing unit 1820 configured to obtain the second operating channel.

In an embodiment, the processing unit 1820 is further configured to: obtain information on the second operating channel from at least one of Beacon frames, broadcast Probe Response frames, Channel Switch Announcement frames, Extended Channel Switch Announcement frames, and Operating Mode Notification frames transmitted by the second AP.

For example, the information on the second operating channel may be included in at least one of a HT Operation element, a VHT Operation element, a HE Operation element, an EHT Operation element, a Neighbor Report element, a Reduced Neighbor Report element, a Channel Switch Announcement element, an Extended Channel Switch Announcement element, and an Operating Mode Notification element.

Figure 19:
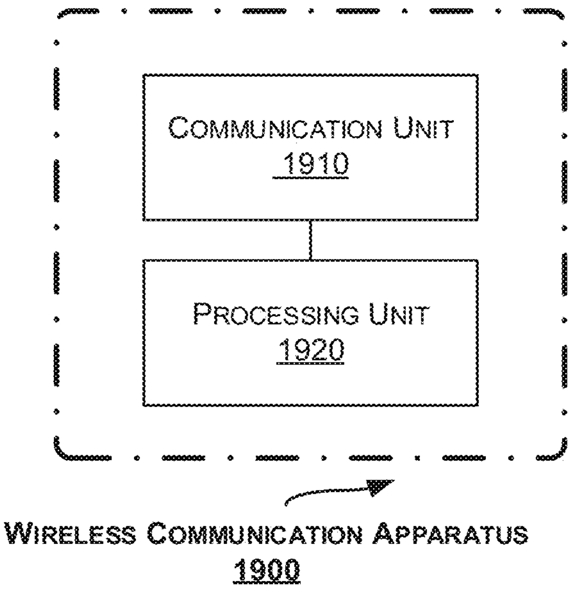
FIG. 19 is a block diagram of a wireless communication apparatus 1900 according to an embodiment of the present disclosure.

Correspondingly to the wireless communication method 900 as described above, a wireless communication apparatus is provided. FIG. 19 is a block diagram of a wireless communication apparatus 1900 according to an embodiment of the present disclosure. The wireless communication apparatus 1900 can be e.g., an AP applicable in IEEE 802.11be EHT WLAN or a next-generation WLAN after EHT WLAN such as Post-EHT WLAN.

As shown in FIG. 19, the wireless communication apparatus 1900 includes: a communication unit 1910 configured to receive a first frame from a first AP initiating a multi-AP coordination. The first frame is used for inquiring about whether the second AP intends to participate in the multi-AP coordination. A least a part of a second operating channel of the second AP overlaps with a first operating channel of the first AP. In this way, the first AP can be called as a sharing AP of the multi-AP coordination, and if the second AP participates in the multi-AP coordination, the second AP may be called as a shared AP of the multi-AP coordination.

In an embodiment, the communication unit 1910 is further configured to: transmit a first EHT MU PPDU at a first frequency portion of the coordinated transmission bandwidth, or solicit transmission of a first EHT TB PPDU at a third frequency portion of the coordinated transmission bandwidth. The first frequency portion is different from a second frequency portion of the coordinated transmission bandwidth, at which the first AP or a third AP participating in the multi-AP coordination transmits a second EHT MU PPDU. The third frequency portion is different from a fourth frequency portion of the coordinated transmission bandwidth, and the first AP or the third AP solicits transmission of a second EHT TB PPDU at the fourth frequency portion.

In an embodiment, the communication unit 1910 is further configured to: transmit a first EHT MU PPDU at a single RU or a single MRU that occupies all the non-punctured 20 MHz channels within a first frequency portion of the coordinated transmission bandwidth, at which the first AP or a third AP participating in the multi-AP coordination transmits a second EHT MU PPDU; or solicit transmission of a first EHT TB PPDU at a single RU or a single MRU that occupies all the non-punctured 20 MHz channels within a second frequency portion of the coordinated transmission bandwidth. The first AP or the third AP solicits transmission of a second EHT TB PPDU at the single RU or the single MRU that occupies all the non-punctured 20 MHz channels within the second frequency portion.

In an embodiment, the communication unit 1910 is further configured to: transmit a first EHT MU PPDU at a single RU or a single MRU that occupies all the non-punctured 20 MHz channels within the coordinated transmission bandwidth, at which the first AP or a third AP participating in the multi-AP coordination transmits a second EHT MU PPDU; or solicit transmission of a first EHT TB PPDU at a single RU or a single MRU that occupies all the non-punctured 20 MHz channels within the coordinated transmission bandwidth. The first AP or a third AP participating in the multi-AP coordination solicits transmission of a second EHT TB PPDU at the single RU or the single MRU that occupies all the non-punctured 20 MHz channels within the coordinated transmission bandwidth.

In an embodiment of the present disclosure, each of the first EHT MU PPDU and the second EHT MU PPDU has a same number of EHT-SIG symbols, a same GI, a same EHT-LTF type, a same number of EHT-LTF symbols, and a same duration of Data field and PE field; or each of the first EHT TB PPDU and the second EHT TB PPDU has a same GI, a same EHT-LTF type, a same number of EHT-LTF symbols, and a same duration of Data field and PE field.

In an embodiment of the present disclosure, EHT-SIG fields of the first EHT MU PPDU and the second EHT MU PPDU have the same content, and/or U-SIG fields of the first EHT MU PPDU and the second EHT MU PPDU have the same content.

In an embodiment of the present disclosure, U-SIG fields of the first EHT TB PPDU and the second EHT TB PPDU have the same content.

In an embodiment, at least a part of the second operating channel overlapping with the first operating channel includes any of the conditions 1 to 4, or only any of the conditions 1 and 2.

In an embodiment, the wireless communication apparatus 1900 may further include: a processing unit 1920 configured to obtain the first operating channel.

In an embodiment, the processing unit 1920 is further configured to: obtain information on the first operating channel from at least one of Beacon frames, broadcast Probe Response frames, Channel Switch Announcement frames, Extended Channel Switch Announcement frames, and Operating Mode Notification frames transmitted by the first AP.

For example, the information on the first operating channel may be included in at least one of a HT Operation element, a VHT Operation element, a HE Operation element, an EHT Operation element, a Neighbor Report element, a Reduced Neighbor Report element, a Channel Switch Announcement element, an Extended Channel Switch Announcement element, and an Operating Mode Notification element.

Figure 20:
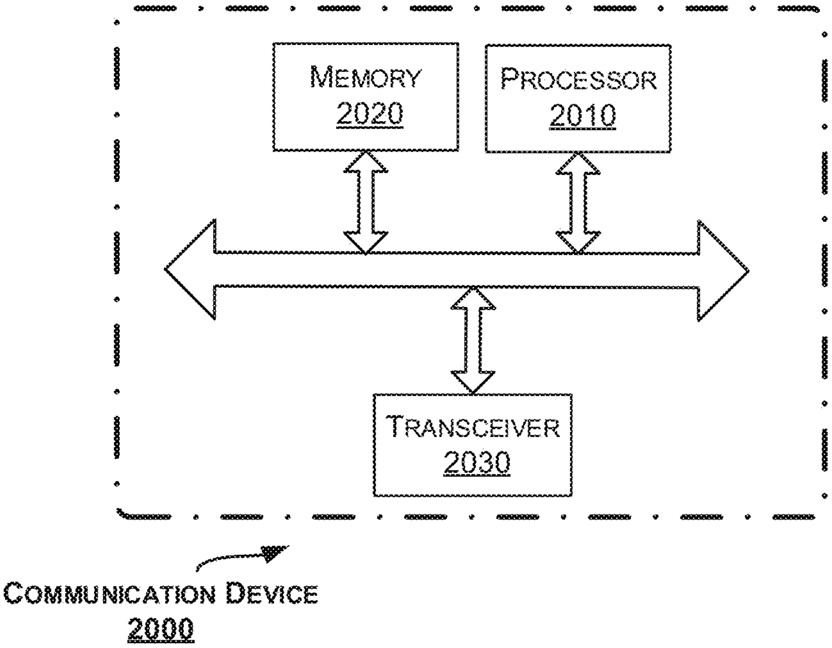
FIG. 20 is a block diagram of a communication device 2000 according to embodiments of the present disclosure.

FIG. 20 is a block diagram of a communication device 2000 according to embodiments of the present disclosure. The communication device 2000 shown in FIG. 20 includes a processor 2010, and the processor 2010 can invoke and run a computer program from a memory to implement the wireless communication method 200 or 900 according to the embodiments of the present disclosure.

In an embodiment, as shown in FIG. 20, the communication device 2000 may further include a memory 2020. The processor 2010 may invoke and run a computer program from the memory 2020 to implement the wireless communication method 200 or 900 according to the embodiments of the present disclosure.

The memory 2020 may be a separate device independent of the processor 2010, or may be integrated in the processor 2010.

In an embodiment, as shown in FIG. 20, the communication device 2000 may further include a transceiver 2030, and the processor 2010 may control the transceiver 2030 to communicate with other devices, e.g., transmitting information or data to other devices, or receiving information or data from other devices.

The transceiver 2030 may include a transmitter and a receiver. The transceiver 2030 may further include one or more antennas.

In an embodiment, the communication device 2000 may be a sharing AP (e.g., the first AP) or a shared AP (e.g., the second AP) of a multi-AP coordination, and the communication device 2000 may implement the corresponding process implemented at the sharing AP or the shared AP in the method according to the embodiments of the present disclosure.

Figure 21:
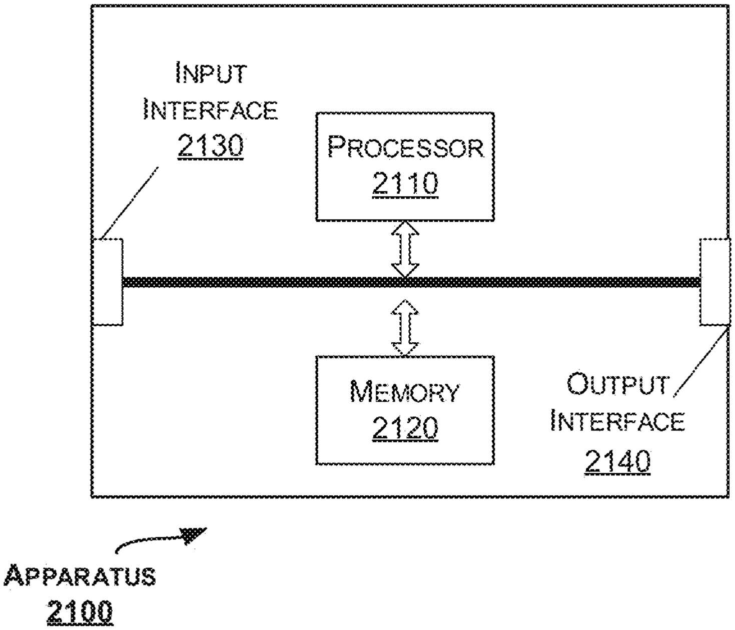
FIG. 21 is a block diagram of an apparatus 2100 according to embodiments of the present disclosure.

FIG. 21 is a block diagram of an apparatus 2100 according to embodiments of the present disclosure. The apparatus 2100 includes a processor 2110, which is configured to invoke and run a computer program from the memory to implement the wireless communication method 200 or 900 according to the embodiments of the present disclosure.

In an embodiment, as shown in FIG. 21, the apparatus 2100 may further include a memory 2120. The processor 2110 may invoke and run a computer program from the memory 2120 to implement the wireless communication method 200 or 900 according to the embodiments of the present disclosure.

The memory 2120 may be a separate device independent of the processor 2110, or may be integrated in the processor 2110.

In an embodiment, the apparatus 2100 may further include an input interface 2130. The processor 2110 may control the input interface 2130 to communicate with other devices or chips, e.g., obtaining information or data sent by other devices or chips.

In an embodiment, the apparatus 2100 may further include an output interface 2140. The processor 2110 can control the output interface 2140 to communicate with other devices or chips, e.g., outputting information or data to other devices or chips.

In an embodiment, the apparatus 2100 can be applied to the sharing AP (e.g., the first AP) or the shared AP (e.g., the second AP) according to the embodiments of the present disclosure, and the apparatus can implement the corresponding process implemented at the sharing AP or the shared AP in the method according to the embodiments of the present disclosure.

In an embodiment, the apparatus can also be a chip. For example, the apparatus can be a system-level chip or a system-on-chip.

Figure 22:
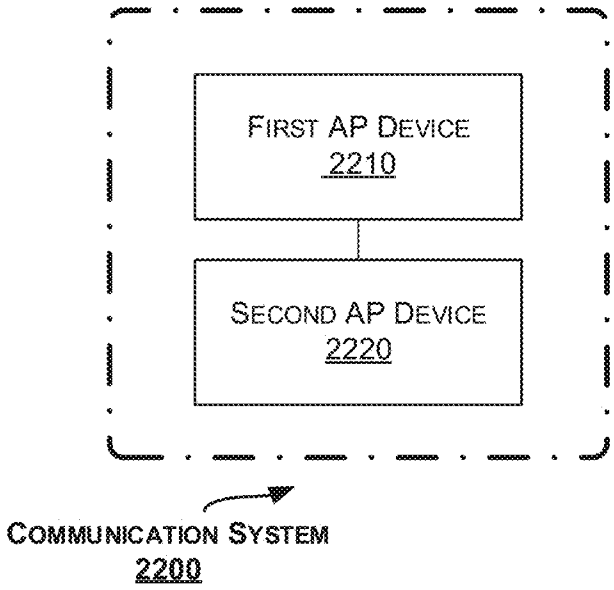
FIG. 22 is a block diagram of a communication system 2200 according to embodiments of the present disclosure.

FIG. 22 is a block diagram of a communication system 2200 according to embodiments of the present disclosure. As shown in FIG. 22, the communication system 2200 includes a first AP device 2210 and a second AP device 2220.

The first AP device 2210 can be used to implement the corresponding function implemented at the first AP in the above method. For example, the first AP device 2210 may transmit a first frame to the second AP 2220 to inquire about whether the second AP intends to participate in the multi-AP coordination.

The second AP device 2220 can be used to implement the corresponding function implemented at the second AP in the above method. For example, the second AP 2220 may receive from the first AP the first frame for inquiring about whether the second AP intends to participate in the multi-AP coordination.

It should be understood that the processor according to the embodiments of the present disclosure may be a single CPU (Central Processing Unit), but could also include two or more processing units. For example, the processor may include general purpose microprocessors; instruction set processors and/or related chips sets and/or special purpose microprocessors such as Application Specific Integrated Circuits (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

The embodiments of the present disclosure also provide a computer readable storage medium having a computer program stored thereon.

In an embodiment, the computer readable storage medium can be applied to the first/second AP according to the embodiments of the present disclosure, and the computer program causes a computer to execute the corresponding process implemented by the first/second AP in each method according to the embodiments of the present disclosure.

The embodiments of the present disclosure also provide a computer program product including computer program instructions.

In an embodiment, the computer program product can be applied to the first/second AP according to the embodiments of the present disclosure, and the computer program instructions cause the computer to perform the corresponding process implemented by the first/second AP in each method according to the embodiments of the present disclosure.

The embodiment of the present disclosure also provides a computer program.

In an embodiment, the computer program can be applied to the first/second AP according to the embodiments of the present disclosure. When executed by the computer, the computer program causes the computer to perform the corresponding process implemented by the first/second AP in each method according to the embodiments of the present disclosure.

The disclosure has been described above with reference to embodiments thereof. It should be understood that various modifications, alternations and additions can be made by one skilled in the art without departing from the spirits and scope of the disclosure. Therefore, the scope of the disclosure is not limited to the above particular embodiments but only defined by the claims as attached.

The invention claimed is:

1. A wireless communication method, applied in a first Access Point (AP) initiating a multi-AP coordination, the wireless communication method comprising:

transmitting a first frame to a second AP, the first frame being used for inquiring about whether the second AP intends to participate in the multi-AP coordination, wherein at least a part of a second operating channel of the second AP overlaps with a first operating channel of the first AP;

wherein the wireless communication method further comprises:

transmitting a first Multi-User (MU) Physical layer Protocol Data Unit (PPDU) at a first frequency portion of a coordinated transmission bandwidth, the first frequency portion being different from a second frequency portion of the coordinated transmission bandwidth, at which the second AP transmits a second MU PPDU; or soliciting transmission of a first Trigger based (TB) Physical layer Protocol Data Unit (PPDU) at a third frequency portion of the coordinated transmission bandwidth, the third frequency portion being different from a fourth frequency portion of the coordinated transmission bandwidth, and the second AP soliciting transmission of a second TB PPDU at the fourth frequency portion;

wherein each frequency portion of the coordinated transmission bandwidth comprises one or more 80 MHz frequency subblocks, and wherein the coordinated transmission bandwidth is 320 MHz and comprises a punctured 80 MHz frequency subblock and two frequency portions, one of the two frequency portions comprising an 80 MHz frequency subblock which is in a same 160 MHz channel as the punctured 80 MHz frequency subblock, and the other one of the two frequency portions comprising the other 160 MHz channel.

2. A wireless communication apparatus, applied in a first Access Point (AP) initiating a multi-AP coordination, the wireless communication apparatus comprising a processor and a memory storing a computer program which, when executed by the processor, causes the wireless communication apparatus to:

transmit a first frame to a second AP, the first frame being used for inquiring about whether the second AP intends to participate in the multi-AP coordination, wherein at least a part of a second operating channel of the second AP overlaps with a first operating channel of the first AP;

wherein the computer program, when executed by the processor, further causes the wireless communication apparatus to:

transmit a first Multi-User (MU) Physical layer Protocol Data Unit (PPDU) at a first frequency portion of a coordinated transmission bandwidth, the first frequency portion being different from a second frequency portion of the coordinated transmission bandwidth, at which the second AP transmits a second MU PPDU; or solicit transmission of a first Trigger based (TB) Physical layer Protocol Data Unit (PPDU) at a third frequency portion of the coordinated transmission bandwidth, the third frequency portion being different from a fourth frequency portion of the coordinated transmission bandwidth, and the second AP soliciting transmission of a second TB PPDU at the fourth frequency portion;

wherein each frequency portion of the coordinated transmission bandwidth comprises one or more 80 MHz frequency subblocks, and wherein the coordinated transmission bandwidth is 320 MHz and comprises a punctured 80 MHz frequency subblock and two frequency portions, one of the two frequency portions comprising an 80 MHz frequency subblock which is in a same 160 MHz channel as the punctured 80 MHz frequency subblock, and the other one of the two frequency portions comprising the other 160 MHz channel.

3. The wireless communication apparatus according to claim 2, wherein each of the first MU PPDU and the second MU PPDU has a same number of EHT-SIGNAL (SIG) symbols, a same Guard Interval (GI), a same EHT-Long Training Field (LTF) type, a same number of EHT-LTF symbols, and a same duration of Data field and Packet Extension (PE) field; or each of the first TB PPDU and the second TB PPDU has a same GI, a same EHT-LTF type, a same number of EHT-LTF symbols, and a same duration of Data field and PE field.

4. The wireless communication apparatus according to claim 2, wherein

EHT-SIG fields of the first MU PPDU and the second MU PPDU have the same content, and/or U-SIG fields of the first MU PPDU and the second MU PPDU have the same content.

5. The wireless communication apparatus according to claim 2, wherein

U-SIG fields of the first TB PPDU and the second TB PPDU have the same content.

6. The wireless communication apparatus according to claim 2, wherein at least a part of the second operating channel overlapping with the first operating channel comprises any of:

the second operating channel being included in the first operating channel;

the second operating channel being the same as the first operating channel;

the second operating channel being inclusive of the first operating channel of the sharing AP; or the second operating channel partially overlaps with but not included in the first operating channel.

7. The wireless communication apparatus according to claim 2, wherein at least a part of the second operating channel overlapping with the first operating channel comprises any of:

the second operating channel being included in the first operating channel; or the second operating channel being the same as the first operating channel.

8. The wireless communication apparatus according to claim 2, wherein the computer program, when executed by the processor, further causes the wireless communication apparatus to:

obtain the second operating channel.

9. The wireless communication apparatus according to claim 8, wherein the computer program, when executed by the processor, further causes the wireless communication apparatus to:

obtain information on the second operating channel from at least one of Beacon frames, broadcast Probe Response frames, Channel Switch Announcement frames, Extended Channel Switch Announcement frames, and Operating Mode Notification frames transmitted by the second AP.

10. The wireless communication apparatus according to claim 9, wherein the information on the second operating channel is included in at least one of a High Throughout (HT) Operation element, a Very High Throughput (VHT) Operation element, a High Efficiency (HE) Operation element, an Extremely High Throughput (EHT) Operation element, a Neighbor Report element, a Reduced Neighbor Report element, a Channel Switch Announcement element, an Extended Channel Switch Announcement element, and an Operating Mode Notification element.

11. A wireless communication apparatus, applied in a second Access Point (AP), the wireless communication apparatus comprising a processor and a memory storing a computer program which, when executed by the processor, causes the wireless communication apparatus to:

receive a first frame from a first AP initiating a multi-AP coordination, the first frame being used for inquiring about whether the second AP intends to participate in the multi-AP coordination, wherein at least a part of a second operating channel of the second AP overlaps with the first operating channel of the first AP;

wherein the computer program, when executed by the processor, further causes the wireless communication apparatus to:

transmit a first Multi-User (MU) Physical layer Protocol Data Unit (PPDU) at a first frequency portion of a coordinated transmission bandwidth, the first frequency portion being different from a second frequency portion of the coordinated transmission bandwidth, at which the first AP or a third AP participating in the multi-AP coordination transmits a second MU PPDU; or solicit transmission of a first Trigger Based (TB) Physical layer Protocol Data Unit (PPDU) at a third frequency portion of the coordinated transmission bandwidth, the third frequency portion being different from a fourth frequency portion of the coordinated transmission bandwidth, and the first AP or the third AP soliciting transmission of a second TB PPDU at the fourth frequency portion;

wherein each frequency portion of the coordinated transmission bandwidth comprises one or more 80 MHz frequency subblocks; and wherein the coordinated transmission bandwidth is 320 MHz and comprises a punctured 80 MHz frequency subblock and two frequency portions, one of the two frequency portions comprising an 80 MHz frequency subblock which is in a same 160 MHz channel as the punctured 80 MHz frequency subblock, and the other one of the two frequency portions comprising the other 160 MHz channel.

* * * * *